(12) United States Patent
Fairbanks et al.

(10) Patent No.: US 12,534,594 B2
(45) Date of Patent: Jan. 27, 2026

(54) ELECTROMAGNETIC WAVE GENERATOR BASED ON NON-LINEAR COMPOSITE MATERIALS

(71) Applicant: Purdue Research Foundation, West Lafayette, IN (US)

(72) Inventors: Andrew Fairbanks, Lafayette, IN (US); Allen L Garner, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 986 days.

(21) Appl. No.: 17/698,014

(22) Filed: Mar. 18, 2022

(65) Prior Publication Data

US 2022/0298324 A1    Sep. 22, 2022

Related U.S. Application Data

(60) Provisional application No. 63/163,895, filed on Mar. 21, 2021.

(51) Int. Cl.
*H01P 3/02*    (2006.01)
*C08K 3/22*    (2006.01)

(52) U.S. Cl.
CPC .................. *C08K 3/22* (2013.01); *H01P 3/02* (2013.01); *C08K 2003/2237* (2013.01);
(Continued)

(58) Field of Classification Search
CPC ..................................... H01P 3/02; H01P 3/06
See application file for complete search history.

(56) References Cited

U.S. PATENT DOCUMENTS

2016/0204739 A1\*   7/2016  Dolan ................... H01Q 13/10
                                                            331/101

OTHER PUBLICATIONS

Zhu. Assessing Effective Medium Theories for Designing Composites for Nonlinear Transmission Lines. Purdue University Thesis. Nov. 27, 2019 Retrieved from: https://hammer.purdue.edu/articles/thesis/Assessing_effective_medium_theories_for_designing_composites_for_nonlinear (Year: 2019).\*

(Continued)

*Primary Examiner* — Matthew E. Hoban
(74) *Attorney, Agent, or Firm* — Piroozi-IP, LLC

(57) ABSTRACT

A transmission line is disclosed which includes a first conductor, a second conductor, a composite disposed between the first conductor and the second conductor, the composite includes non-linear inclusions comprising one or more of non-linear dielectric and non-linear magnetic inclusions mixed in a matrix material, wherein the non-linear dielectric inclusions are selected from the group consisting of barium strontium titanate (BST), barium titanate, strontium titanate, barium zirconate titanate, lead zirconate titanate, lead titanate, lithium niobate, potassium niobate, lead scandium tantalate, strontium barium niobate, and combinations thereof, and the non-linear magnetic inclusions are selected from the group consisting of nickel zinc ferrite (NZF), manganese zinc ferrite, cobalt ferrite, manganese ferrite, zinc ferrite, nickel ferrite, and combinations thereof, wherein the non-linear inclusions by volume are about 25% NZF, about 10% BST/15% NZF, and about 15% BST/10% NZF, and wherein the first conductor, the second conductor, and the composite form a capacitor.

7 Claims, 18 Drawing Sheets

(52) U.S. Cl.
CPC ............... C08K 2003/2296 (2013.01); C08K 2201/001 (2013.01); C08K 2201/01 (2013.01)

(56) References Cited

OTHER PUBLICATIONS

Author: Ali et al., "On short-range pulse propagation described by (2+1)-dimensional Schrodinger's hyperbolic equation in nonlinear optical fibers", Phys. Scr. 95 (2020).
Author: Kuek et al., "Oscillating pulse generator based on a nonlinear inductive line", IEEE Transactions on Plasma Science, vol. 41, No. 10, Oct. 2013.
Author: Rossi et al., "Overview of RF generation using nonlinear transmission lines", IEEE 2015.
Author: Albanna et al., "Performance comparison and device analysis between Si IGBT and SiC Mosfet", IEEE 2016.
Author: Rangel et al., "Practical Constraints on Nonlinear Transmission Lines for RF Generation", IEEE Transactions on Plasma Science, vol. 47, No. 1, Jan. 2019.
Author: Rukin et al. "Pulsed power technology based on semiconductor opening switches: A review", Rev. Sci. Instrum. 91, 011501 (2020).
Author: Kuek et al., "Pulsed RF oscillations on a nonlinear capacitive transmission line", IEEE Transactions on Dielectrics and Electrical Insulation vol. 20, No. 4; Aug. 2013.
Author: Amanatiadis et al., "Radiation Efficiency Enhancement of Graphene THz Antennas Utilizing Metamaterial Substrates", IEEE Antennas and Wireless Propagation Letters, vol. 16, 2017.
Author: Roychoudhury et al., "Recent advances in metamaterial split-ring-resonator circuits as biosensors therapeutic agents", Biosensors and Bioelectronics 86 (2016).
Author: Al_Naib et al., "Recent progress In Terahertz metasurfaces", J Infrared Milli Terahz Waves (2017).
Author: Ninic et al., "Reconfigurable multi-state composite split-ring resonators" IEEE Microwave and Wireless Components Letters, vol. 26, No. 4, Apr. 2016.
Author: Romanchenko et al., "Repetitive sub-gigawatt rf source based on gyromagnetic nonlinear transmission line", Review of Scientific Instruments 83, 074705 (2012).
Author: Shamonin et al., "Resonant frequencies of a split-ring resonator: analytical solutions and numerical simulation", Microwave and Optical Technology Letters / vol. 44, No. 2, Jan. 20, 2005.
Author: Kuek et al., "RF Pulse Generator Based on a Nonlinear Hybrid Line", IEEE Transactions on Plasma Science, vol. 42, No. 10, Oct. 2014.
Author: Yamasaki et al., "RF Generation using Nonlinear Transmission Lines for Aerospace Applications", IEEE 2013.
Author: Seddon et al., "RF Pulse Formation in Nonlinear Transmission Lines", IEEE 2007.
Author: Marques et al., "Role of bianisotropy in negative permeability and left-handed metamaterials", Physical Review B, vol. 65 2002.
Author: Gyorgy,"Rotational model of flux reversal in square loop ferrites", Journal of Applied Physics 28, 1011 (1957).
Author: Powell et al., "Self-tuning mechanisms of nonlinear split-ring resonators", Applied Physics Letters 91, 144107 2007.
Author: Brosseau, "Modelling and simulation of dielectric heterostructures: a physical survey from an historical perspective", J. Phys. D: Appl. Phys. 39 (2006).
Author: Elliott, "Novel approaches to multiscale modelling in materials science", International Materials Reviews, 56:4, 207-225 (2011).
Author: Tuncer et al., "On dielectric breakdown statistics", J. Phys. D: Appl. Phys. 39 (2006 ).
Author: Granqvist et al., "Optical properties of ultrafine gold particles", Physical Review B vol. 16, No. 8, 1977.
Author: Giordano, "Order and disorder in heterogeneous material microstructure: Electric and elastic characterisation of dispersions of pseudo-oriented spheroids", International Journal of Engineering Science 43 (2005).
Author: Fan et al., "Particle simulation of filamentary structure formation in dielectric barrier discharge", Applied Physics Letters 102, 094103 (2013).
Author: Wu et al., "Percolation exponents and thresholds obtained from the nearly ideal continuum percolation system graphite-boron nitride", Physical Review B vol. 56, No. 3, 1997.
Author: Balberg et al., "Percolation and Tunneling in Composite Materials", International Journal of Modern Physics B vol. 18, No. 15 (2004).
Author: Li et al., "Permeability and Permittivity Uncertainty Effects in Modeling Absorbing Coatings and Ferrites on Cables", IEEE 2012.
Author: Nan et al., "Physical properties of composites near percolation", 2010.
Author: Chen et al., "PIC/MCC Simulation of the Ionization Process for Filamentary Streamer Plasma Jet at Atmosphere Pressure in Argon", IEEE Transactions on Plasma Science, vol. 40, No. 11, Nov. 2012.
Author: Balberg et al., "Possible origin of the smaller-than-universal percolation-conductivity exponent in the continuum", Physical Review E 93, 062132 (2016).
Author: Myroshnychenko et al., "Possible manifestation of nonuniversality in some continuum percolation systems", J. Phys. D: Appl. Phys. 41 (2008).
Author: McLachlan, "A quantitative analysis of the volume fraction dependence of the resistivity of cermets using a general effective media equation", Journal of Applied Physics 68, 195 (1990).
Author: O'Connor et al., "Recent Results in the Development of Composites for High Energy Density Capacitors", IEEE 2014.
Author: Idris et al., "Recent developments of smart electromagnetic absorbers based polymer-composites at gigahertz frequencies", Journal of Magnetism and Magnetic Materials 405(2016).
Author: Bauhofer et al., "A review and analysis of electrical percolation in carbon nanotube polymer composites", Composites Science and Technology 69 (2009).
Author: Qin et al., "A review and analysis of microwave absorption in polymer composites filled carbonaceous particles", Journal of Applied Physics 111, 061301 (2012).
Author: Wu et al., "Scaling behavior of the complex conductivity of graphite-boron nitride percolation systems", Physical Review B vol. 58, No. 22, 1998.
French et al., "Spatially Dispersive Ferrite Nonlinear Transmission Line with Axial Bias," IEEE Transactionson Plasma Science, 2014.
Pendry, "A Chiral Route to Negative Refraction", Science 306, Nov. 19, 2004.
Qureshi et al., "A Compact and Low-Profile Metamaterial Ring Antenna With Vertical Polarization", IEEE Antennas and Wireless Propagation Letters 4:333-336, 2005.
Bartley et al., "A New Technique for the Determination of the Complex Permittivity and Permeability of Materials", IEEE Instrumentation & Measurement Technology Conference Proceedings, 2010.
Sairajan et al., "A review of multifunctional structure technology for aerospace applications", Acta Astronautica 120:30-42, 2016.
Garner et al., "A Semi-Empirical Approach for Predicting the Performance of Multiphase Composites at Microwave Frequencies", IEEE Transactions on Dielectrics and Electrical Insulation 23(2): 1126-1134, Apr. 2016.
Tsai et al., "A UWB Antenna With Bandnotched Filters Using Slot-type Split Ring Resonators", Microwave and Optical Technology Letters 58(11): 2595-2598, Nov. 2016.
Rahman et al., "A Fine Picosecond Pulse Generator Based on Novel SRD Topology and Tapered NLTL", IEEE/MTT-S International Microwave Symposium, pp. 301-304, 2020.
Gillette et al., "Active tuning of a microstrip hairpin-line microwave bandpass filter on a polycrystalline yttrium iron garnet substrate using small magnetic fields", Journal of Applied Physics 109, 07A513, 2011.

(56) References Cited

OTHER PUBLICATIONS

Bragg et al., "All solid-state high power microwave source with high repetition frequency", Review of Scientific Instruments 84, 054703, 2013.
Poutrina et al., "Analysis of nonlinear electromagnetic metamaterials", New Journal of Physics 12 093010, 2010.
Sydoruk et al., "Analytical formulation for the resonant frequency of split rings", Journal of Applied Physics 105, 014903, 2009.
Fatoorehchi et al., "Analytical approximate solutions for a general nonlinear resistor-nonlinear capacitor circuit model", Applied Mathematical Modelling 39, 2015.
Stenglein et al., "Analytical calculation method for the non-linear characteristic of ferrite-cored inductors with stepped air gap", Electr Eng 99:421-429, 2017.
Liu et al., "Anomalous dielectric nonlinearity and dielectric relaxation in xBST-(1-x) (LMT-LNT) ceramics", Appl Phys A 105:363-368, 2011.
Maslovski et al., "Artificial Magnetic Materials Based on the New Magnetic Particle: Metasolenoid", Progress in Electromagnetics Research, PIER 54:61-81, 2005.
Reale et al., "Bias-field controlled phasing and power combination of gyromagnetic nonlinear transmission lines", Review of Scientific Instruments 85, 054706, 2014.
Choi et al., "Broadband VCO Using Electronically Controlled Metamaterial Transmission Line Based on Varactor-loaded Split-ring Resonator", Microwave and Optical Technology Letters 50(4), Apr. 2008.
Aydin et al., "Capacitor-loaded split ring resonators as tunable metamaterial components", Journal of Applied Physics 101, 024911, 2007.
Author: Kim et al., "Miniaturised self-resonant split-ring resonator antenna", Electronics Letters Feb. 12, 2009.
Author: Bossard et al., "Mitigating Field Enhancement in Metasurfaces and Metamaterials for High-Power Microwave Applications", IEEE Transactions on Antennas and Propagation, vol. 64, No. 12, Dec. 2016.
Author: Steinbrecher et al., "Model order reduction of nonlinear circuit equations", Int. J. Circ. Theor. Appl. 2013.
Author: Crowne, "Modeling and Simulation of Nonlinear Transmission Lines", ARL-TR-5062 Jan. 2010.
Author: Harris, "Modern microwave ferrites", IEEE Transactions on Magnetics, vol. 48, No. 3, Mar. 2012.
Author: Ferreira et al., "Multifunctional Material Systems: A state_of_the_art review", Composite Structures 151 (2016).
Author: Xu et al., "Multimode and Wideband Printed Loop Antenna Based on Degraded Split-Ring Resonators", IEEE Access, vol. 5, 2017.
Author: Ul'Maskulov et al., "Multistage converter of high-voltage subnanosecond pulses based on nonlinear transmission lines", J. Appl. Phys. 126, 084504 (2019).
Author: Tala_Tebue et al., "New Jacobi elliptic function solutions, solitons and other solutions for the (2+1)-dimensional nonlinear electrical transmission line equation", Eur. Phys. J. Plus (2018).
Author: Gaudet et al., "Nonlinear Transmission Lines for High Power Microwave Applications—A Survey", IEEE 2008.
Author: Curecheriu et al., "Nonlinear dielectric properties of Ba1-xSrxTiO3 ceramics", Journal of Alloys and Compounds 482 (2009).
Author: Kozyrev et al., "Nonlinear left-handed transmission line metamaterials", J. Phys. D: Appl. Phys. 41 (2008).
Author: Sawado et al., "Nonlinear magnetic lattice and the modified Korteweg_de Vries equation", Physical Review B vol. 38, No. 16, 1988.
Author: French et al., "Nonlinear transmission line based electron beam driver", Review of Scientific Instruments 83, 123302 (2012).
Author: Afshari et al., "Nonlinear Transmission Lines for pulse shaping in silicon", IEEE Journal of Solid-State Circuits, vol. 40, No. 3, Mar. 2005.
Author: Chen et al., "Nonlinear Capacitance of Ionic Polymer-Metal Composites", Electroactive Polymer Actuators and Devices (EAPAD) 2009.

Author: Tuncer et al., "Nonlinear conductivity in silicon nitride", Solid-State Electronics 134 (2017).
Author: Gluskin, "A nonlinear resistor and nonlinear inductor using a nonlinear capacitor", Journal of the Franklin Institute 336 (1999).
Author: Nikoo, "Nonuniform Line Generator for High-Power RF Applications", IEEE Transactions on Plasma Science, vol. 46, No. 1, Jan. 2018.
Author: Wang et al., "Significantly Enhanced Breakdown Strength and Energy Density in Sandwich-Structured Barium Titanate/Poly(vinylidene fluoride) Nanocomposites", Adv. Mater. 2015.
Author: Brown et al., "Solid Mixture Permittivities", The Journal of Chemical Physics 23, 1514 (1955).
Author: Bober et al., "Tailoring the microwave permittivity and permeability of composite materials", International Journal of Infrared and Millimeter Waves, vol. 18, No. L 1997.
Author: Wang et al., "Effect of High Aspect Ratio Filler on Dielectric Properties of Polymer Composites: A Study on Barium Titanate Fibers and Graphene Platelets", IEEE Transactions on Dielectrics and Electrical Insulation vol. 19, No. 3; Jun. 2012.
Author: Noel et al., "The Dielectric Strength of High Frequency Metamaterial Composites", IEEE 2015.
Author: Huang et al., "The effects of nanoparticles and organic additives with controlled dispersion on dielectric properties of polymers: Charge trapping and impact excitation", Journal of Applied Physics 120, 055102 (2016).
Author: Bianco et al., "A Unifying Approach for Obtaining Closed-Form Expressions of Mixtures Permittivity", Journal of Electrostatics, 15 (1984).
Author: Hashin et al., "A Variational Approach to the Theory of the Effective Magnetic Permeability of Multiphase Materials", Journal of Applied Physics 33, 3125 (1962).
Author: Fairbanks et al., "A Review of Nonlinear Transmission Line System Design", IEEE Access Aug. 11, 2020.
Author: Garner et al., "Accounting for Conducting Inclusion Permeability in the Microwave Regime in a Modified Generalized Effective Medium Theory", IEEE Transactions on Dielectrics and Electrical Insulation vol. 22, No. 4; Aug. 2015.
Author: Fairbanks et al., "Electromagnetic measurements of composites containing barium strontium titanate or nickel zinc ferrite inclusions from 1 to 4 GHz", Composites Science and Technology 210 (2021).
Author: Fairbanks et al., "Electromagnetic properties of multiphase composites containing barium strontium titanate and nickel zinc ferrite inclusions from 1-4 GHz", Composites Science and Technology 211 (2021).
Author: Zhu et al., "Modelling effective electromagnetic properties of composites containing barium strontium titanate and/or nickel zinc ferrite inclusions from 1 to 4 GHz", Composites Science and Technology vol. 214, Sep. 29, 2021.
Author: Crawford et al., "Nonlinear Permeability Measurements for Nickel Zinc Ferrite and Nickel Zinc Ferrite/Barium Strontium Titanate Composites From 1 to 4 GHz", IEEE Transactions on Magnetics, vol. 57, No. 6, Jun. 2021.
Author: Fairbanks et al., "Nonlinear transmission line implemented as a combined pulse forming line and high-power microwave source", Rev. Sci. Instrum. 92, 104702 (2021).
Author: Garner et al., "Predicting effective permittivity of composites containing conductive inclusions at microwave frequencies", AIP Advances 2, 032109 (2012).
Author: Fairbanks et al., "Simulated and Measured Output From a Composite Nonlinear Transmission Line Driven by a Blumlein Pulse Generator", IEEE Transactions On Plasma Science, vol. 49, No. 11, Nov. 2021.
Author: Brosseau, "Generalized effective medium theory and dielectric relaxation in particle-filled polymeric resins", Journal of Applied Physics 91, 3197 (2002).
Author: Liu et al., "Generalized retrieval method for metamaterial constitutive parameters based on a physically driven homogenization approach", Physical Review B 87, 235136 (2013).
Author: Li et al., "High dielectric constant, low loss, and low percolation threshold dielectric composites based on polyvinylidene fluoride and ferroferric oxide nanorods", Applied Physics Letters 109, 072905 (2016).

(56) References Cited

OTHER PUBLICATIONS

Author: Pearson et al., "High Voltage Breakdown Analysis of Nickle-Zinc Ferrite Double-Positive Metamaterials", IEEE 2015.
Author: Beier et al., "Improved Breakdown Strength and Energy Density in Thin-Film Polymide Nanocomposites with Small Barium Strontium Titanate Nanocrystal Fillers", J. Phys. Chem. C 2013.
Author: Siddabattuni et al., "Improved polymer nanocomposite dielectric breakdown performance through barium titanate to epoxy interface control", Materials Science and Engineering B 176 (2011).
Author: Shi et al., "An Improved NRW Method to Extract Electromagnetic Parameters of Metamaterials", Microwave and Optical Technology Letters / vol. 58, No. 3, Mar. 2016.
Author: Brosseau et al., "Influence of uniaxial tension on the microwave absorption properties of filled polymers", Journal of Applied Physics 104, 074907 (2008).
Author: Aspnes et al., "Investigation of effective-medium models of microscopic surface roughness by spectroscopic ellipsometry", Physical Review B, vol. 20, No. 8, 1979.
Author: Arezoomandan et al., "Large nanoscale electronic conductivity in complex oxide heterostructures with ultra high electron density", APL Mater. 4, 076107 (2016).
Author: Fulco et al., "Magnetic properties of polymer matrix composites with embedded ferrite particles", NDT&E International 77 (2016).
Author: Koledintseva et al., "A Maxwell Garnett Model for Dielectric Mixtures Containing Conducting Particles at Optical Frequencies", Progress In Electromagnetics Research, PIER 63, 223-242, 2006.
Author: Fricke, "The Maxwell wagner dispersion in a suspension of ellipsoids", Walter B. James Laboratory of Biophysics, Biological Laboratory, Cold Spring Harbor, N. Y., 1953.
Author: McLachlan, "Measurement and analysis of a model dual-conductivity medium using a generalised effective-medium theory", J. Phys. C: Solid State Phys. 21 (1988).
Author: Rahatekar et al., "Mesoscale modeling of electrical percolation in fiber-filled systems", The Journal of Chemical Physics 123, 134702 (2005).
Author: Zhao et al., "Microwave absorbing properties of activated carbon-fiber felt screens (vertical-arranged carbon fibers)/epoxy resin composites", Materials Science and Engineering B 127 (2006).
Author: Xu et al., "Microwave absorption enhancement and dual-nonlinear magnetic resonance of ultra small nickel with quasi-one-dimensional nanostructure", Applied Surface Science 428 (2018).
Author: Asohi et al., "Microwave and mechanical properties of quartz/graphene-based polymer nanocomposites", Applied Physics Letters 102, 072903 (2013).
Author: Mishra et al., "Modeling of Microwave Heating of Particulate Metals", Metallurgical and Materials Transactions B vol. 37B, Oct. 2006.
Author: Bossard, "Genetic Algorithm Synthesis of Metasurfaces with Improved Similarity and Robustness for High-Power Reflector Antenna Applications", IEEE, 2015.
Author: Bagiante et al., "Giant Electric Field Enhancement in Split Ring Resonators Featuring nanometer-sized gaps", Scientific Reports, 5 : 8051, 2015.
Author: Perruisseau_Carrier, "Graphene for antenna applications: Opportunities and challenges from microwaves to THz", Loughborough Antennas & Propagation Conference, 2012.
Author: Ulmasculov et al., "Gyromagnetic nonlinear transmission line generator of high voltage pulses modulated at 4 GHz frequency with 1000 Hz pulse repetition rate", J. Phys.: Conf. Ser. 830 012027, 2017.
Author: Romanchenko et al., "Gyromagnetic RF source for interdisciplinary research", Review of Scientific Instruments 88, 024703 (2017).
Author: Hoff et al., "High current nonlinear transmission line based electron beam driver", Physical Review Accelerators and Beams 20, 100401 (2017).
Author: Noel et al., "High frequency properties of high voltage barium titanate-ferrite multiferroic metamaterial composites", IEEE Transactions on Dielectrics and Electrical Insulation vol. 23, No. 5; Oct. 2016.
Author: Ashby et al., "High peak and average power with an L-band relativistic magnetron on CLIA", IEEE Transactions on Plasma Science, vol. 20, No. 3, Jun. 1992.
Author: Romanchenko et al., "High power microwave beam steering based on gyromagnetic nonlinear transmission lines", Journal of Applied Physics 117, 214907 (2015).
Author: Raimundi et al., High voltage capacitive nonlinear transmission lines for RF generation based on silicon carbide Schottky diodes, IEEE Transactions on Plasma Science, vol. 47, No. 1, Jan. 2019.
Author: Abdelrehim et al., "High performance terahertz slotted waveguide antenna based on electrically split ring resonator metasurface employing low epsilon medium for E-plane beam focusing", Microwave and optical technology letters, vol. 59, Issue 7, 2017.
Author: Bossard et al., "High-Power Considerations in Metamaterial Antennas", IEEE 2014.
Author: Neto et al., "High-Power RF Generation From Nonlinear Transmission Lines With Barium Titanate Ceramic Capacitors", IEEE Transactions on Plasma Science, vol. 44, No. 12, Dec. 2016.
Author: Kudryashov, "Highly dispersive solitary wave solutions of perturbed nonlinear Schrodinger equations", Applied Mathematics and Computation 371 (2020).
Author: Darling et al., "High-power pulsed RF extraction from nonlinear lumped element transmission lines", IEEE Transactions on Plasma Science, vol. 36, No. 5, Oct. 2008.
Author: Ikezi et al., "High-power soliton generation at microwave frequencies", Journal of Applied Physics 64, 3277 (1988).
Author: French et al., "High power microwave source with a three dimensional printed metamaterial slow-wave structure", Review of Scientific Instruments 87, 053308 (2016).
Author: Huang, "Development of Analog Nonlinear Materials Using Varactor Loaded Split-ring Resonator Metamaterials", Duke University PhD Dissertation, 2013.
Author: Neto et al., "Increasing the voltage modulation depth of the RF produced by NLTL", IEEE Transactions on Plasma Science, 2020.
Tokuyama et al., "Chaos in a Series Circuit with a Nonlinear Capacitor and a Nonlinear Inductor", Electrical Engineering in Japan 150(2):35-42, 2005.
Johnson et al., "Characteristics of a Four Element Gyromagnetic Nonlinear Transmission Line Array High Power Microwave Source", Review of Scientific Instruments 87, 054704, 2016.
Neto et al., "Characterization of Ceramic Dielectrics for Sub-GHz Applications in Nonlinear Transmission Lines", IEEE Transactions on Plasma Science 42(10):3274-3282, Oct. 2014.
Kuek et al., "Circuit Modeling of Nonlinear Lumped Element Transmission Lines Including Hybrid Lines", IEEE Transactions on Plasma Science 40(10):3274-3282, Oct. 2012.
Rahman et al., "Circularly Split-ring-resonator-based Frequency-reconfigurable Antenna", Appl. Phys. A 123:110, 2017.
Ul'Maskulov et al., "Coherent Summation of Radiation from Four-Channel Shock-Excited RF Source Operating at 4 GHz and a Repetition Rate of 1000 Hz", IEEE Transactions on Plasma Science 45(10): 2623-2628, Oct. 2017.
Lapine et al., "Colloquium: Nonlinear metamaterials", Reviews of Modern Physics 86(3):1093-1123, Jul.-Sep. 2014.
Islam et al., "Compact Metamaterial Antenna for UWB Applications", Electronics Letters 51(16):1222-1224, Aug. 6, 2015.
Kim et al., "A Compact Quasi-Isotropic Antenna Based on Folded Split-Ring Resonators", IEEE Antennas and Wireless Propagation Letters, 16:294-297, 2017.
Marques et al., "Comparative Analysis of Edge- and Broadside-Coupled Split Ring Resonators for Metamaterial Design-Theory and Experiments", IEEE Transactions on Antennas and Propagation 51(10):2572-2581, Oct. 2003.
Smith et al., "Composite Medium with Simultaneously Negative Permeability and Permittivity", Physical Review etters 84(18):4184-4187, May 1, 2000.

(56) References Cited

OTHER PUBLICATIONS

Pendry et al., "Controlling Electromagnetic Fields", Science 312:1780-1782, Jun. 23, 2016.
Hsieh, "Coupled Mode Theory in a Lossy, Nonlinear Transmission Line System", J. Appl. Phys. 62(5):2095-2102, Sep. 1, 1987.
Tang et al., "Coupled Split-Ring Resonator Circular Polarization Selective Surface", IEEE Transactions on Antennas and Propagation 65(9):4664-4675, Sep. 2017.
Okamoto et al., "Dependence of LC Resonance Wavelength on Size of Silver Split-ring resonator Fabricated by Nanosphere Lithography", Optics Express 20(21):24059-24067, Oct. 8, 2012.
Elnaggar et al., "Description and Stability Analysis of Nonlinear Transmission Line Type Metamaterials Using Nonlinear Dynamics Theory", Journal of Applied Physics 121, 124902, 2017.
Liu et al., "Description and Explanation of Electromagnetic Behaviors in Artificial Metamaterials Based on Effective Medium Theory", Physical Review E 76, 026606, 2007.
Bensafieddine et al., "Design of Tunable Microwave Transmission Lines Using Metamaterial Cells", Appl. Phys. A 123:248, 2017.
Smith et al., "Determination of Effective Permittivity and Permeability of Metamaterials from Reflection and Transmission Coefficients", Physical Review B 65, 195104, 2002.
Author: Curry,"Development of Metamaterial Composites for Compact High Power Microwave Systems and Antennas", May 2016.
Author: Ianculescu et al., "Dielectric and tunability properties of La-doped $BaTiO_3$ ceramics", Journal of Alloys and Compounds 509 (2011) 10040-10049.
Author: French et al., "Dielectric Nonlinear Transmission Line", IEEE 2011.
Author: Vendik, "Dielectric nonlinearity of the displacive ferroelectrics at UHF", Ferroelectrics, 1976.
Author: Ávila et al., "Dielectric permittivity calculation of composites based on electrospun barium titanate fibers", Mater. Res. Express 2 (2015).
Author: Zhang et al., "Dielectric response of MgO-added Ba0.6Sr0.4TiO3 ceramics under bias electric field: Examination of contributing mechanisms", Physica B 410(2013).
Author: Liou et al., "Dielectric tunability of barium strontium titanate/silicone-rubber composite", Journal of Physics: Condensed Matter 10 (1998).
Author: Sauviac et al., "Double Split-Ring Resonators: Analytical Modeling and Numerical Simulations", Electromagnetics, 24:5, 317-338,2010.
Author: Koledintseva et al., Double Statistical Distribution of conductivity and aspect ratio of inclusions in dielectric mixtures at microwave frequencies, Progress In Electromagnetics Research, PIER 77, 193-214, 2007.
Author: Nadaud et al., "Effect of the incident power on permittivity, losses and tunability of $BaSRTiO_3$ thin films in the microwave frequency range", Applied Physics Letters, 110 2017.
Author: Gholipur et al., " Effect of electric field on the dielectric and magnetic properties of random nanocomposites", Materials and Design 94 2016.
Author: Seviour et al., "Effects of High Power on Microwave Metamaterials", 8th International Congress on Advanced Electromagnetic Materials in Microwaves and Optics—Metamaterials 2014.
Author: Narahara, "Efficiency of three-wave mixing in nonlinear composite right- and left-handed transmission lines", IEICE Electronic Express, vol. 11, No. 16, 1-8 2014.
Author: Adnan, "Efficient microwave and millimeter-wave frequency multipliers using nonlinear transmission line in cmos technology", IEEE Transactions on Microwave Theory and Techniques, vol. 63, No. 9, Sep. 2015.
Author: Nouri, Efficient simulation of nonlinear transmission lines via model-order reduction, IEEE Transactions on Microwave Theory and Techniques, vol. 65, No. 3, Mar. 2017.
Author: Peng et al., "Efficient radiation by electrically small antennas made of coupled split-ring resonance", Scientific Reports 2016.
Author: Huynh et al., "Electrical property enhancement by controlled percolation structure of carbon black in polymer-based nanocomposites via nanosecond pulsed electric field" Composites Science and Technology 154 (2018).
Author: French et al., "Electron beam coupling to a metamaterial structure", Physics of Plasmas 20, 083116 (2013).
Author: Yuan et al., "Biphasic Polymer Blends Containing Carbon Nanotubes: Heterogeneous Nanotube Distribution and Its Influence on the Dielectric Properties", J. Phys. Chem. C 2012.
Author: Donnay et al., "Boron nitride filled epoxy with improved thermal conductivity and dielectric breakdown strength", Composites Science and Technology 110 (2015).
Author: Milton et al., "Bounds on the complex permittivity of a two-component composite material", Journal of Applied Physics 52, 5286 (1981).
Author: Khardani et al., "Bruggeman effective medium approach for modelling optical properties of porous silicon: comparison with experiment", phys. stat. sol. (c) 4, No. 6, 1986-1990 (2007).
Author: Kang et al., "Carbon nanotube-graphene composite film as transparent conductive electrode for GaN-based light-emitting diodes", Applied Physics Letters 109, 081902 (2016).
Author: Sareni et al., "Complex effective permittivity of a lossy composite material", Journal of Applied Physics 80, 4560 (1996).
Author: Brosseau et al., "Computational electromagnetics and the rational design of new dielectric heterostructures", Progress in Materials Science 48 (2003).
Author: Han et al., "Core/shell structured C/ZnO nanoparticles composites for effective electromagnetic wave absorption", RSC Adv., 2016.
Author: Bouaicha et al., "Correlation of electrical conductivity and photoluminescence in nanoporous silicon", Materials Science and Engineering C 26 (2006).
Author: Veldes et al., "Coupled backward- and forward-propagating solitons in a composite right lef hand transmission line", Physical Review E 88, 013203 (2013).
Author: Phelps et al., "Cross Sections and Swarm Coefficients for Nitrogen Ions and Neutrals in N2 and Argon Ions and Neutrals in Ar for Energies from 0.1 eV to 10 keV", Journal of Physical and Chemical Reference Data 20, 557 (1991).
Author: Chen et al., "Crossover phenomena of percolation transition in evolution networks with hybrid attachment", Chaos 26, 083114 (2016).
Author: Taherian et al., "Development of an Equation to Model Electrical Conductivity of Polymer-Based Carbon Nanocomposites", ECS Journal of Solid State Science and Technology, 3 (6) M26-M38 (2014).
Author: Bergman, "The Dielectric Constant of a Composite Material—A Problem in Classical Physics", Physics Reports (Section C of Physics Letters) 43, No. 9 (1978).
Author: Sundar et al., "Dielectric and piezoelectric properties of percolative three-phase piezoelectric polymer composites", Journal of Vacuum Science & Technology B 34, 041232 (2016).
Author: Sumita et al., "Dispersion of fillers and the electrical conductivity of polymer blends filled with carbon black", Polymer Bulletin 25, 265-271 (1991).
Author: Sareni et al., "Effective dielectric constant of random composite materials", Journal of Applied Physics 81, 2375 (1997).
Author: Kale et al., Effect of filler alignment on percolation in polymer nanocomposites using tunneling-percolation model, Journal of Applied Physics 120, 045105 (2016).
Author: De Vivo et al., "The effect of filler aspect ratio on the electromagnetic properties of carbon-nanofibers reinforced composites", Journal of Applied Physics 118, 064302 (2015).
Author: Doyle et al., "Effective cluster model of dielectric enhancement in metal-insulator composites", Physical Revie B, vol. 42, No. 15.
Author: Myroshnychenko et al., "Effective complex permittivity of two-phase random composite media: A test of the two exponent phenomenological percolation equation", Journal of Applied Physics 103, 084112 (2008).
Author: Sareni et al., "Effective dielectric constant of periodic composite materials", Journal of Applied Physics 80, 1688 (1996).
Author: Bosch et al., "Effective dielectric function of mixtures of three or more materials: a numerical procedure for computations", Surface Science 453 (2000).

(56) References Cited

OTHER PUBLICATIONS

Author: Brosseau et al., "Effective magnetic permeability of Ni and Co micro- and nanoparticles embedded in a ZnO matrix", Journal of Applied Physics 97, 104325 (2005).
Author: Giordano, "Effective medium theory for dispersions of dielectric ellipsoids", Journal of Electrostatics 58 (2003).
Author: Sihvola et al., "Effective Permittivity of Dielectric Mixtures", IEEE Transactions on Geoscience and Remote Sensing. vol. 26, No. 4. Jul. 1988.
Author: Celzard et al., "Electrical conductivity of carbonaceous powders", Carbon 40 (2002).
Author: McLachlan et al., "Electrical Resistivity of Composites", J. Am. Ceram. Soc., 73 [8] 2187-2203 (1990).
Author: Brigandi et al., "Electrically Conductive Multiphase Polymer Blend Carbon-Based Composites", Polymer Engineering and Science, 2014.
Author: Zhang et al., "Effective medium theory for anisotropic metamaterials", Scientific Reports, 5 : 7892, 2015.
Author: Merrill et al., "Effective Medium Theories for Artificial Materials Composed of Multiple Sizes of Spherical Inclusions in a Host Continuum", IEEE Transactions on Antennas and Propagation, vol. 47, No. 1, Jan. 1999.
Author: Zheng et al., "Enhanced breakdown strength of poly(vinylidene fluoride) utilizing rubber nanoparticles for energy storage application", Applied Physics Letters 109, 072902 (2016).
Author: Phelps et al., "Excitation and breakdown of Ar at very high ratios of electric field to gas density", Physical Review A vol. 38, No. 6, 1988.
Author: Jing et al., "Extraction of Permittivity and Permeability for Ferrites and Flexible Magnetodielectric Materials Using a Genetic Algorithm", IEEE Transactions on Electromagnetic Compatibility, 2015.
Author: Myroshnychenko et al., "Finite-element method for calculation of the effective permittivity of random inhomogeneous media", Physical Review E 71, 016701 (2005).
Author: Myroshnychenko et al., "Finite-element modeling method for the prediction of the complex effective permittivity of two-phase random statistically isotropic heterostructures", Journal of Applied Physics 97, 044101 (2005).
Author: Ghodgaonkar et al., "Free-Space Measurement of Complex Permittivity and Complex Permeability of Magnetic Materials at Microwave Frequencies", IEEE Transactions on Instrumentation and Measurement. vol. 39. No. 2. Apr. 1990.
Author: Stroud, "Generalized effective-medium approach to the conductivity of an inhomogeneous materials", Physical Review B, vol. 12, No., 8, 1975.
Author: Rowe et al., "Inductive Meandered Metal Line Metamaterial for Rectangular Waveguide Linings", IEEE Transactions on Plasma Science, vol. 45, No. 4, Apr. 2017.
Author: Rangle et al., "Influence of input pulse shape on RF generation in nonlinear transmission lines", IEEE Transactions on Plasma Science, vol. 44, No. 10, Oct. 2016.
Author: Zabusky, "Interaction of "solitons" in a collisionless plasma and the recurrence of initial states", Physics Review Letters, vol. 15, No. 6, 1965.
Author: Liu et al., "Investigating the Impact of Microwave Breakdown on the responses of high-power microwave metamaterials", IEEE Transactions On Plasma Science, vol. 41, No. 10, Oct. 2013.
Author: Reale et al., "Investigation of a stripline transmission line structure for gyromagnetic nonlinear transmission line high power microwave sources", Review of Scientific Instruments 87, 034706 (2016).
Author: Li et al., "Large and switchable dielectric tunability in Na1/2Bi1/2Cu3Ti4O12 ceramics", Journal of Alloys and Compounds 695 (2017).
Author: Akem et al., "Leapfrogging of electrical solitons in coupled nonlinear transmission lines: effect of an imperfect varactor", SN Applied Sciences (2020).
Author: Lee et al., "Lumped-element model of a tapered transmission line for impedance matching in a pulsed power system", Journal of the Korean Physical Society, vol. 69, No. 2, Jul. 2016.
Author: Linden et al., "Magnetic response of metamaterials at 100 terahertz", Science vol. 306 Nov. 19, 2004.
Author: Belomyttsev et al., "Magnetically insulated coaxial vacuum diode with partial space_charge_limited explosive emission from edge-type cathode", Journal of Applied Physics 119, 023304 (2016).
Author: Pendry et al., "Magnetism from Conductors and Enhanced Nonlinear Phenomena", IEEE Transactions on Microwave Theory and Techniques, vol. 47, No. 11, Nov. 1999.
Author: Johnson et al., "Material selection of a ferrimagnetic loaded coaxial delay line for phasing gyromagnetic nonlinear transmission lines", Review of Scientific Instruments 86, 084702 (2015).
Author: Bragg et al., "Material selection considerations for coaxial, ferrimagnetic-based nonlinear transmission lines", Journal of Applied Physics 113, 064904 (2013).
Author: Sun et al., "Mechanism for composite materials with dielectric constant which increases with electric field", IEEE Transactions on Dielectrics and Electrical Insulation vol. 22, No. 3; Jun. 2015.
Author: Koschny et al., "Metamaterials in microwaves, optics, mechanics, thermodynamics, and transport", J. Opt. 19 (2017).
Author: Baev et al., "Metaphotonics: An emerging field with opportunities and challenges", Physics Reports 594 (2015).
Author: Turner et al., "Methods of theoretical analysis and computer modeling of the shaping of electrical pulses by nonlinear transmission lines and lumped-element delay lines", IEEE Transactions on Electron Devices, vol. 38, No. 4. Apr. 1991.
Author: He et al., "Microstructures and dielectric tunable properties of Ba0.5Sr0.5TiO3-MgO-Mg3B2O6 composite ceramics", Ceramics International41(2015).
Author: Branch et al., "Shock Waves in Transmission Lines With Nonlinear Dielectrics", IEE Colloquium on Pulsed Power, 1993.
Author: Zhao et al., "Simulation Studies for Nonlinear-Transmission-Line Based Ultrafast Rise Times and Waveform Shaping for Pulsed-Power Applications", IEEE Transactions on Plasma Science, vol. 36, No. 5, Oct. 2008.
Author: Yamasaki et al., Simulation Studies of Distributed Nonlinear Gyromagnetic lines based on LC lumped model, IEEE Transactions on Plasma Science, vol. 44, No. 10, Oct. 2016.
Author: Hoff et al., "Simulations of a Disk-on-Rod TWT Driven by an NLTL-Modulated Electron Beam", IEEE Transactions on Plasma Science, vol. 44, No. 8, Aug. 2016.
Author: Gusev et al., "Solid-state repetitive generator with a gyromagnetic nonlinear transmission line operating as a peak power amplifier", Review of Scientific Instruments 88, 074703 (2017).
Author: Yamasaki et al., "Soliton Generation Using Nonlinear Transmission Lines", IEEE Transactions on Plasma Science, vol. 42, No. 11, Nov. 2014.
Author: Kayum et al., "Soliton solutions to voltage analysis in nonlinear electrical transmission lines and electric signals in telegraph lines", Results in Physics 18 (2020).
Author: Martin et al., "Split ring resonator-based left-handed coplanar waveguide", Appl. Phys. Lett. 83, 4652 (2003).
Author: Aydin et al., "Split-Ring-Resonator-Coupled Enhanced Transmission through a Single Subwavelength Aperture", Physical Review Letters PRL 102, 013904 (2009).
Author: Rossi et al., "State of the art of nonlinear transmission lines for applications in high power microwaves", IEEE 2013.
Author: Silva et al., "Study of pulsed RF signal extraction and irradiation from capacitive nonlinear transmission line", International Journal of Advanced Engineering Research and Science (IJAERS) vol. 5, Issue—10, Oct. 2018.
Author: Liu et al., "Study on the polarization and relaxation processes of ferroelectric polymer films using the sawyer-tower circuit with square voltage waveform", J. Phys. Chem. C 2017.
Author: Nornikman et al., "Study and Simulation of an Edge Couple Split Ring Resonator (EC-SRR) on Truncated Pyramidal Microwave Absorber", Progress In Electromagnetics Research, vol. 127, 319-334, 2012.
Author: Rossi et al., "Study of Hybrid Nonlinear Transmission Lines for High Power RF Generation", IEEE 2009.

(56) References Cited

OTHER PUBLICATIONS

Author: Payandehjoo, "Study of Nonlinear Transmission Lines and their Applications", Thesis McGill University, 2006.
Author: Shiffler et al., "Study of Split-Ring Resonators as a Metamaterial for High-Power Microwave Power Transmission and the Role of Defects", IEEE Transactions on Plasma Science, vol. 41, No. 6, Jun. 2013.
Author: Liu et al., "Studying Contact Stress Fields caused by surface tractions with a discrete convolution and fast Fourier transform algorithm", Transactions of the ASME vol. 124, Jan. 2002.
Author: Duan et al., "Sub-wavelength waveguide loaded by a complementary electric metamaterial for vacuum electron devices", Physics of Plasmas 21, 103301 (2014).
Author: Payandehjoo et al., "Suppression of unwanted harmonics using integrated complementary split-ring resonators in nonlinear transmission line frequency multipliers", IEEE Transactions on Microwave Theory and Techniques, vol. 56, No. 4, Apr. 2008.
Author: Maity et al., "Tailored CuO nanostructures decorated amorphous carbon nanotubes hybrid for efficient field emitter with theoretical validation", Carbon 127 (2018).
Author: Veselago et al., "The electrodynamics of substances with simultaneously negative $\epsilon$ and $\mu$", Soviet Physics vol. 10, No. 4, 1968.
Author: Zhang et al., "The high DC electric field effects on the dielectric behavior of barium strontium titanate ceramics", Trans Tech Publications, Switzerland, 2013.
Author: Calico, "The Phillips Laboratory's Rep-Rate Pulser for high-power microwave source development", 1993.
Author: Mattei et al., "Theoretical and experimental modelling of composites with oriented soft magnetic particles", Journal of Magnetism and Magnetic Materials 160 (1996).
Author: Hirota et al., "Theoretical and experimental studies lattice solitons nonlinear lumped networks", Proc. of IEEE 1973.
Author: Siang et al., "Theoretical and Experimental Studies on nonlinear lumped element transmission lines RF generation", PhD Thesis, National University of Singapore, 2013.
Author: Thabet et al., "Theoretical investigation effective permeability new magnetic composite materials", International Journal on Electrical Engineering and Informatics—vol. 6, No. 3, Sep. 2014.
Author: Moser et al., "Terahertz Response of a Microfabricated Rod-Split-Ring-Resonator Electromagnetic Metamaterial", Physical Review Letters PRL 94, 063901 (2005).
Author: Wang et al., "Topologically enhanced harmonic generation in a nonlinear transmission line metamaterial", Nature Communications 2019.
Author: El Badawae et al., "A True Metasurface Antenna", Scientific Reports 2016.
Author: Sun et al., "Tunable Negative Permittivity with Fano-like Resonance and Magnetic Property in Percolative Silver/Yttrium Iron Garnet Nanocomposites", J. Phys. Chem. C 2017.
Author: Boeuf et al., "Tutorial_Physics and modeling of Hall thrusters", Journal of Applied Physics 121, 011101 (2017).
Author: Rigi_Tamandani et al., "Wideband Planar Split Ring Resonator Based Metamaterials", Progress In Electromagnetics Research M, vol. 28, 115-128, 2013.
Author: Lau, "Advanced Rf Sources Based on Novel Nonlinear Transmission Lines", University of Michigan, 2015.
Author: Gao et al., "ZnO microvaristors doped polymer composites with electrical field dependent nonlinear conductive and dielectric characteristics", Materials Letters 171(2016).
Author: Chiteme et al., "ac and dc conductivity, magnetoresistance, and scaling in cellular percolation systems", Physical Review B 67, 024206 (2003).
Author: Chen et al., "AC Susceptibilities of Conducting Cylinders and Their Applications in Electromagnetic Measurements", IEEE Transactions on Magnetics, vol. 41, No. 9, Sep. 2005.
Author: Gupta et al., "Aspects of dielectric breakdown in a model for disordered non-linear composites", Physica A 247 (1997).
Author: Romanchenko et al., "Energy Levels of Oscillations in a Nonlinear Transmission Line Filled with Saturated Ferrite", Technical Physics, 2010, vol. 55, No. 7, pp. 1024-1027, 2010.
Author: Szabó et al., "Equivalence of Magnetic Metamaterials and Composites in the View of Effective Medium Theories", IEEE Transactions on Magnetics, vol. 50, No. 4, Apr. 2014.
Author: Bilotti et al., "Equivalent-Circuit Models for the Design of Metamaterials Based on Artificial Magnetic Inclusions", IEEE Transactions on Microwave Theory and Techniques, vol. 55, No. 12, Dec. 2007.
Author: Baena et al., Equivalent-circuit models for split-ring resonators and complementary Split-Ring Resonators coupled to planar transmission lines, IEEE Transactions on Microwave Theory and Techniques, vol. 53, No. 4, Apr. 2005.
Author: Kengne et al., "Exact solutions of the derivative nonlinear Schrodinger equation for a nonlinear transmission line", Physical Review E 73, 026603 2006.
Author: Rafique et al., "Exploration of Epoxy Resins Hardening Systems, and Epoxy/Carbon Nanotube Composite Designed for High Performance Materials: A Review", Polymer-Plastics Technology and Engineering 55:3, 312-333, 2015.
Author: Afshari et al., "Extremely wideband signal shaping using one- and two-dimensional nonuniform nonlinear transmission lines", Journal of Applied Physics 99, 054901, 2006.
Author: Luebbers et al., FDTD calculation of transient pulse propagation through a nonlinear magnetic sheet, IEEE Transactions on electromagnetic compatibility, vol. 35, No. 1, 1993.
Author: Bragg et al., Ferrimagnetic Nonlinear Transmission Lines as High-Power Microwave Sources, IEEE Transactions on Plasma Science, vol. 41, No. 1, Jan. 2013.
Author: Adam et al., "Ferrite devices and materials", IEEE Transactions on Microwave Theory and Techniques, vol. 50, No. 3, Mar. 2002.
Author: Qin et al., "Ferromagnetic microwires enabled multifunctional composite materials", Progress in Materials Science 58 (2013).
Author: Padurariu et al., "Field-dependent permittivity in nanostructure BaTiO3 ceramics: Modeling and experimental verification", Physical Review B 85, 224111 (2012).
Author: Ul'Maskulov et al., "Four-channel generator of 8GHz radiation based on gyromagnetic non-linear transmitting lines", Rev. Sci. Instrum. 90, 064703 (2019).
Author: Romanchenko et al., "Four channel high power rf source with beam steering based on gyromagnetic nonlinear transmission lines", Rev. Sci. Instrum. 88, 054703 (2017).
Author: Mumcu et al., "Frequency-Agile Bandpass Filters Using Liquid Metal Tunable Broadside Coupled Split Ring Resonators", IEEE Microwave and Wireless Components Letters, vol. 23, No. 4, Apr. 2013.
Author: Kabiri et al., "On the Fundamental Limitations of Artificial Magnetic Materials", IEEE Transactions on Antennas and Propagation, vol. 58, No. 7, Jul. 2010.
Author: Dadgarpour et al., "Gain enhancement of planar antenna enabled by array of Split-Ring Resonators", IEEE Transactions on Antennas and Propagation, vol. 64, No. 8, Aug. 2016.
Author: Slovick et al., "Generalized effective-medium theory for metamaterials", Physical Review B 89, 155118 (2014).
Author: Rostov et al., "Generation of Subgigawatt RF Pulses in Nonlinear Transmission Lines", IEEE Transactions on Plasma Science, vol. 38, No. 10, Oct. 2010.

\* cited by examiner

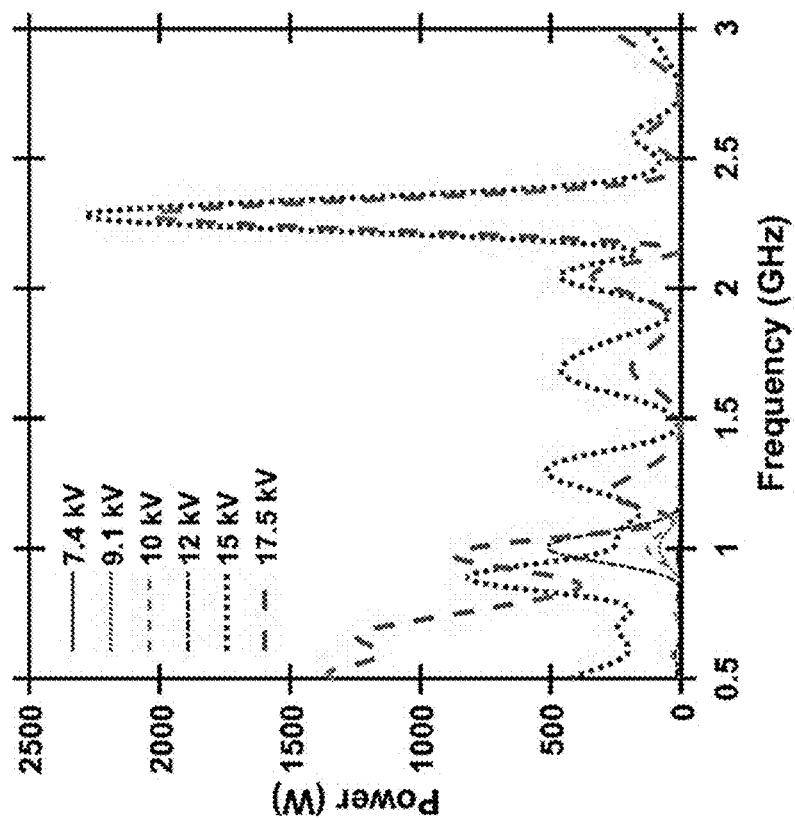
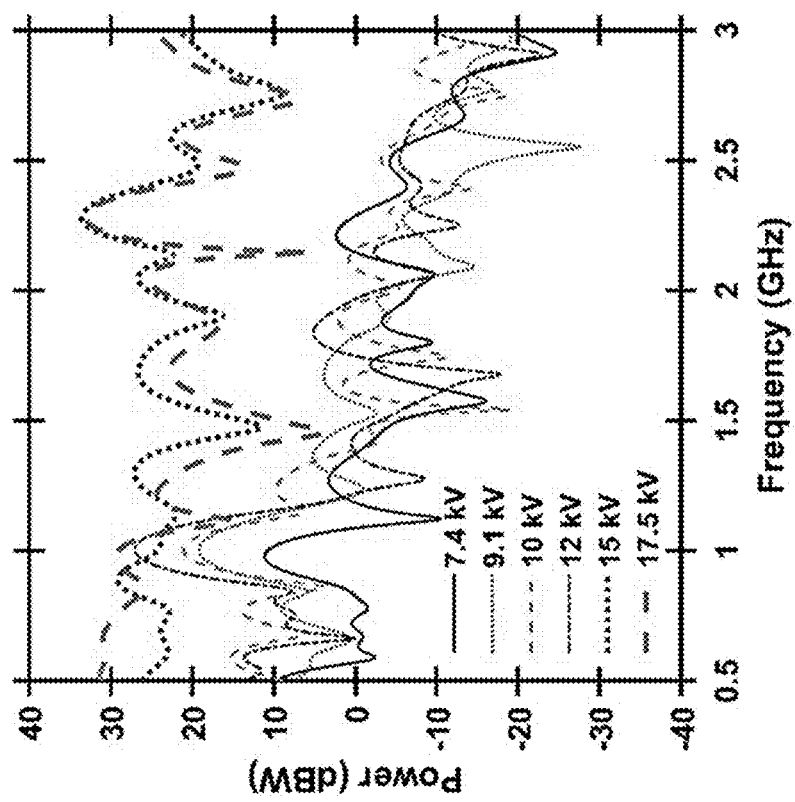
FIG. 17b
FIG. 17a

ELECTROMAGNETIC WAVE GENERATOR BASED ON NON-LINEAR COMPOSITE MATERIALS

CROSS-REFERENCE TO RELATED APPLICATIONS

The present patent application is related to and claims the priority benefit of U.S. Provisional Patent Application Ser. No. 63/163,895 filed Mar. 21, 2021, the contents of which are hereby incorporated by reference in its entirety into the present disclosure.

STATEMENT REGARDING GOVERNMENT SUPPORT

This invention was made with government support under N00014-18-1-2341 awarded by the Office of Naval Research. The government has certain rights in the invention.

TECHNICAL FIELD

The present disclosure generally relates to apparatuses for generating electromagnetic waves, and in particular, to a method and system for generating electromagnetic waves based on non-linear composite materials.

BACKGROUND

This section introduces aspects that may help facilitate a better understanding of the disclosure. Accordingly, these statements are to be read in this light and are not to be understood as admissions about what is or is not prior art.

Transmission lines are ubiquitous in modern societies. A transmission line is generally regarded as a structure that can transfer electromagnetic energy from one point to another. These structures have sufficient length to allow formation of electromagnetic waves.

In recent history, however, a transmission line has not only been utilized to convey electromagnetic energy but to actually generate such energy, e.g., high-power microwave transmission. Towards this end, non-linear transmission lines (NLTLs) are utilized as solid-state high-power microwave (HPM) sources that utilize non-linear permittivity and/or permeability of materials to produce high power radiofrequency (RF) output. Conventional HPM sources use vacuum tubes, such as magnetrons, and require auxiliary systems, such as cryogenic cooling, electromagnets, high voltage modulators, and vacuum systems. NLTLs reduce this footprint by eliminating some of said auxiliary systems. However, traditional NLTLs still require a high voltage modulator to apply a fast (<10 ns rise time) pulse to the transmission line.

Examples of such high voltage modulators include Marx generators, pulse forming networks (PFNs), or pulse forming lines (PFLs). Marx generators allow for compact voltage multiplication, but generally do not have very fast rise times (approximately 5-50 ns). PFNs are compact and can provide large voltage outputs, although they are limited to the voltage threshold of the capacitors used therein. PFLs provide a square pulse based on the line's length and impedance and are limited by the voltage threshold of the dielectric material used therein. The PFN is a series of N number of LC ladders, made of physical capacitors C and inductors L, yielding a pulse width $\tau=N\sqrt{LC}$. The PFL consists of coaxial cables with a dielectric separating the central cable from a metal outer conductor. Coaxial cables can also be modeled as a series of LC ladders with the capacitance and inductance given per unit length and the pulse width a function of the length of the coaxial cable.

However, each of these systems has a footprint that is too large for many applications.

Therefore, there is an unmet need for a novel configuration to generate electromagnetic waves, e.g., high-power microwave bursts utilizing an NLTL which has a reduced footprint as compared to prior art approaches.

SUMMARY

A composite, is disclosed. The composite includes non-linear inclusions comprising one or more of non-linear dielectric and non-linear magnetic inclusions mixed in a matrix material. The non-linear dielectric inclusions are selected from the group consisting of barium strontium titanate (BST), barium titanate, strontium titanate, barium zirconate titanate, lead zirconate titanate, lead titanate, lithium niobate, potassium niobate, lead scandium tantalate, strontium barium niobate, and combinations thereof, and the non-linear magnetic inclusions are selected from the group consisting of nickel zinc ferrite (NZF), manganese zinc ferrite, cobalt ferrite, manganese ferrite, zinc ferrite, nickel ferrite, and combinations thereof. The non-linear inclusions by volume are about 25% NZF, about 10% BST/15% NZF, and about 15% BST/10% NZF.

A transmission line is also disclosed which includes a first conductor, a second conductor, and a composite disposed between the first conductor and the second conductor. The composite includes non-linear inclusions including one or more of non-linear dielectric and non-linear magnetic inclusions mixed in a matrix material. The non-linear dielectric inclusions are selected from the group consisting of barium strontium titanate (BST), barium titanate, strontium titanate, barium zirconate titanate, lead zirconate titanate, lead titanate, lithium niobate, potassium niobate, lead scandium tantalate, strontium barium niobate, and combinations thereof, and the non-linear magnetic inclusions are selected from the group consisting of nickel zinc ferrite (NZF), manganese zinc ferrite, cobalt ferrite, manganese ferrite, zinc ferrite, nickel ferrite, and combinations thereof. The non-linear inclusions by volume are about 25% NZF, about 10% BST/15% NZF, and about 15% BST/10% NZF, and wherein the first conductor, the second conductor, and the composite form a capacitor.

A system for generating electromagnetic waves is also disclosed. The system includes a voltage source, and a transmission line coupled to the voltage source. The transmission line includes a first conductor, a second conductor; and a composite disposed between the first conductor and the second conductor. The composite includes non-linear inclusions including one or more of non-linear dielectric and non-linear magnetic inclusions mixed in a matrix material. The non-linear dielectric inclusions are selected from the group consisting of barium strontium titanate (BST), barium titanate, strontium titanate, barium zirconate titanate, lead zirconate titanate, lead titanate, lithium niobate, potassium niobate, lead scandium tantalate, strontium barium niobate, and combinations thereof, and the non-linear magnetic inclusions are selected from the group consisting of nickel zinc ferrite (NZF), manganese zinc ferrite, cobalt ferrite, manganese ferrite, zinc ferrite, nickel ferrite, and combinations thereof. The non-linear inclusions by volume are about 25% NZF, about 10% BST/15% NZF, and about 15% BST/10% NZF. The voltage source has a ground that is coupled to second conductor of the transmission line. The first conductor, the second conductor, and the composite form a capacitor. The capacitor in the transmission line is charged by the voltage source and when quickly discharged, generates an electromagnetic wave.

BRIEF DESCRIPTION OF DRAWINGS

FIGS. 17a, 17b, 18a, and 18b are graphs of power in dBW (FIGS. 17a and 18a) and W (FIGS. 17b and 18b) vs. Frequency in GHz are provided which show the output spectrum for oscillations during the pulse flat top and at the end of the pulse, respectively, when using a 15% BST/10% NZF composite-based NLTL.

DETAILED DESCRIPTION

Figure 1:
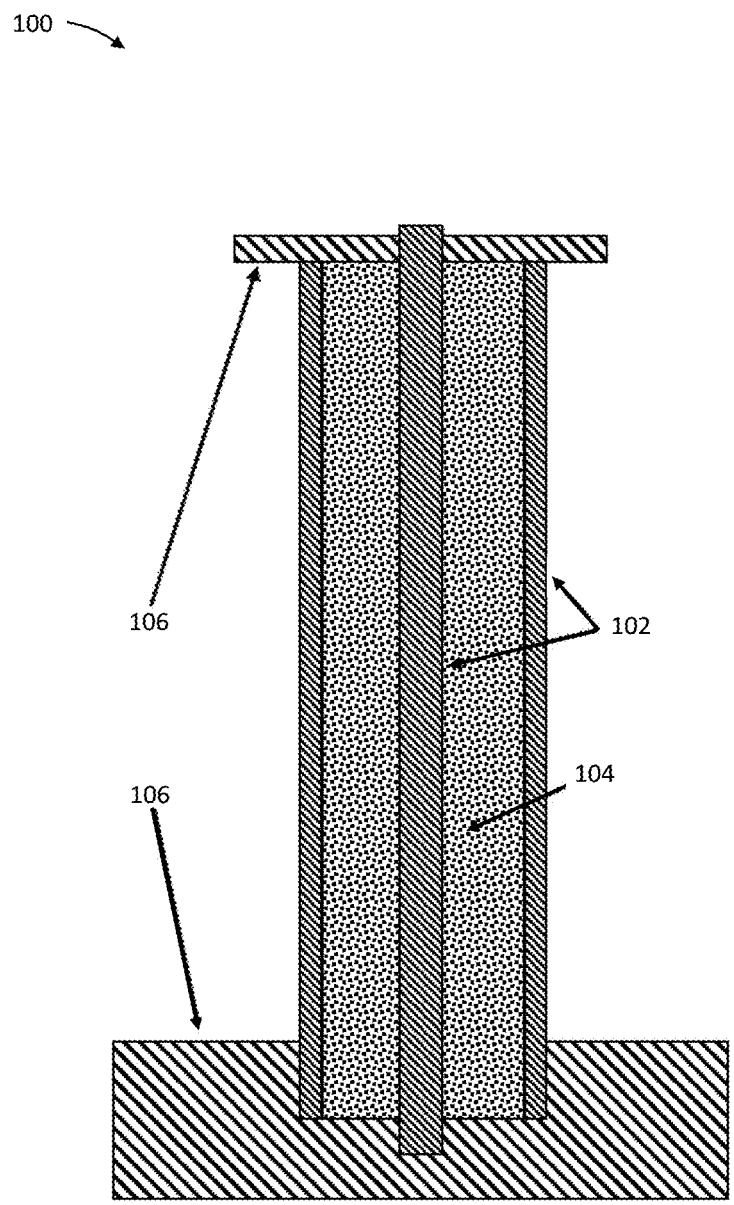
FIG. 1 is a schematic cross-sectional diagram of a non-linear transmission line (NLTL) according to the present disclosure showing two conductors (inner and outer) with a composite disposed therebetween.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach is presented herein to generate electromagnetic waves, e.g. high-power microwaves, from a non-linear transmission line (NLTL). Towards this end, the present disclosure describes a system and method for generating high-power microwaves (HPM) with fewer auxiliary systems than conventional systems of the prior art. A compact HPM system is thus disclosed that utilizes a composite based hybrid NLTL as a pulse forming line (PFL) and HPM source as a single device. The NLTL includes a composite material as a dielectric material disposed in a coaxial configuration (i.e., cross section represents a center conductor surrounded by the composite material as a dielectric and the composite is surrounded by a shield conductor) or planar (i.e., two laterally separated conductors separated by the composite material as the dielectric). The present disclosure provides a variety of different combinations of materials that constitute the composite material, including nickel zinc ferrite (NZF) and barium strontium titanate (BST) inclusions loaded in a polydimethylsiloxane (PDMS) host material to provide magnetic field dependent permeability and electric field dependent permittivity, respectively. Non-limiting examples include: about 25% NZF, about 10% BST/15% NZF, and about 15% BST/10% NZF. By constructing the NLTL in a coaxial geometry, this device uses the capacitance, inductance, and length of the NLTL to generate a fast rise-time high voltage pulse with microwave oscillations both during and after the pulse upon exceeding a threshold charging voltage. The output frequency of the NLTLs with said composite material ranged from 950 MHz to 2.2 GHz during the pulse for 25% NZF, 10% BST/15% NZF, and 15% BST/10% NZF composites and was 1 GHz after the pulse for the 10% BST/15% NZF and 15% BST/10% NZF volume loadings. The oscillations generated after the pulse were much higher in amplitude and achieved 160 kW at a 15 kV charging voltage for the 15% BST/10% NZF composite-based NLTL.

According to one embodiment, composites with BST or NZF spherical inclusions mixed in a silicone matrix were manufactured at volume fractions ranging from 5% to 25%. The dielectric and magnetic parameters were measured from 1-4 GHz using a coaxial airline. The relative permittivity increased from 2.74±0.01 for the polydimethylsiloxane (PDMS) host material to 7.45±0.33 after combining PDMS with a 25% volume fraction of BST inclusions. The relative permittivities of BST and NZF composites were relatively constant across all measured frequencies. The relative permeability of the composites increased from 1.001±0.001 for PDMS to 1.43±0.04 for a 25% NZF composite at 1 GHz. The relative permeability of the 25% NZF composite decreased from 1.43±0.05 at 1 GHz to 1.17±0.01 at 4 GHz. The NZF samples also exhibited low dielectric and magnetic loss tangents from 0.005±0.01 to 0.091±0.015 and 0.037±0.001 to 0.20±0.038, respectively, for all volume fractions, although the dielectric loss tangent did increase with volume fraction. For BST composites, all volume fraction changes of at least 5% yielded statistically significant changes in permittivity; no changes in BST volume fraction yielded statistically significant changes in permeability. For NZF composites, the change in permittivity was statistically significant when the volume fraction varied by more than 5% and the change in permeability was statistically significant for variations in volume fraction greater than 10%. The DC electrical breakdown strength of NZF composites decreased exponentially with increasing volume fraction of NZF, while BST composites exhibited no statistically significant variation with volume fraction. It should be noted that adding as little as 10% BST to the NZF composite increased the electrical breakdown strength greater than 800%, as shown in Table 1.

with magnetic field, rely on the precession of the magnetic moments, described by the Landau-Lifshitz-Gilbert equation, around an effective magnetic field to produce electromagnetic waves. Ferroelectric materials, whose permittivity varies with electric field, have a permanent polarization vector due to an offset titanium atom in the crystalline lattice. When the material is near the Curie temperature, the offset atom can move to alternate stable positions, thus rotating the polarization vector. When the temperature exceeds the Curie temperature, the material is in a paraelectric state, meaning that the asymmetry of the lattice disappears and the titanium atom is centered in the cubic lattice. The hysteretic behavior of the ferroelectric state is not present in the paraelectric state, although the material exhibits significant non-linearity with the permittivity decreasing with increasing electric field. Adding strontium atoms to barium titanate (BT) to form barium strontium titanate (BST) decreases the Curie temperature from 123° C. to 25° C., permitting room temperature operation. Common ferroelectric materials include BT, strontium titanate (ST), and BST.

To demonstrate the concept of a low-footprint electromagnetic wave generating NLTL, a coaxial NLTL was reduced to practice using a 1 in copper tube with an internal diameter of 0.75 in as the outer conductor and a 0.5 in copper rod as the center conductor resulting in a 10Ω impedance NLTL. The composites were made by weighing the base (Part A PDMS SYLGARD 184) and adding the required amounts of NZF (FP350 PPT TECHNOLOGIES) and BST (HBS-8000 TPL INC.) to achieve the proper volume loading. The mixtures were then stirred by hand for 5 min to incorporate the powders into the PDMS base. We next placed the mixtures in a planetary centrifuge (THINKY AR100) for 5 min at 400 rpm to thoroughly mix the composites. Composites containing BST were then placed in an ultrasonic bath for 4 h to break up any conglomerations of powder. We added a curing agent at a ratio of 1:10 mass of the PDMS base, and mixed by hand for 5 min. The mixtures were then placed in a vacuum chamber at <20 kPa for 30 min to remove any air bubbles that may have been introduced. The samples were then poured slowly into the outer conductor at an angle to mitigate any addition of air into the mixture. Next, we placed the outer conductor with the composite into the vacuum chamber for 5 min at <20 kPa to remove any air that had been introduced. The center conductor was then slowly inserted into the line and was centered by an aluminum block. Again, the mixture with the center conductor inserted was placed in the vacuum chamber for 5 min at <20 kPa to remove any gas that may have been

TABLE 1

DC dielectric breakdown threshold in kV/cm for composites with various volume loadings of BST and NZF in a PDMS matrix.

| | | NZF Volume Fraction (%) * | | | |
|---|---|---|---|---|---|
| | | 0 | 5 | 10 | 15 |
| BST Volume Fraction (%) | 0 | 710.42 ± 279.07 kV/cm | 395.68 ± 111.041 | 133.51 ± 14.58 | 49.90 ± 8.64 |
| | 5 | 838.86 ± 73.72 | 567.59 ± 247.00 | 392.24 ± 155.37 | N/A |
| | 10 | 585.15 ± 229.28 | 597.53 ± 68.15 | 428.50 ± 13.58 | 401.20 ± 150.73 |
| | 15 | 644.29 ± 111.25 | N/A | 423.75 ± 103.53 | N/A |

* Values are reported as the average of four measurements with error determined by standard deviation. Samples labeled N/A were not tested.

NLTLs are traditionally comprised of ferromagnetic or ferroelectric materials. Traditional gyromagnetic NLTLs utilizing ferromagnetic materials, whose permeability varies introduced. Finally, we placed another aluminum block on top of the line to ensure the center conductor was centered and placed the line in an oven (THERMO SCIENTIFIC HERATHERM OGS180) at 100° C. for 2 h to cure. FIG. 1 is a schematic cross-sectional diagram of the NLTL 100 showing two conductors (inner and outer) 102 with the composite 104 disposed therebetween and positioned between two aluminum blocks 106 that hold the center conductor in a central position while the composite 104 is cured.

Figure 2:
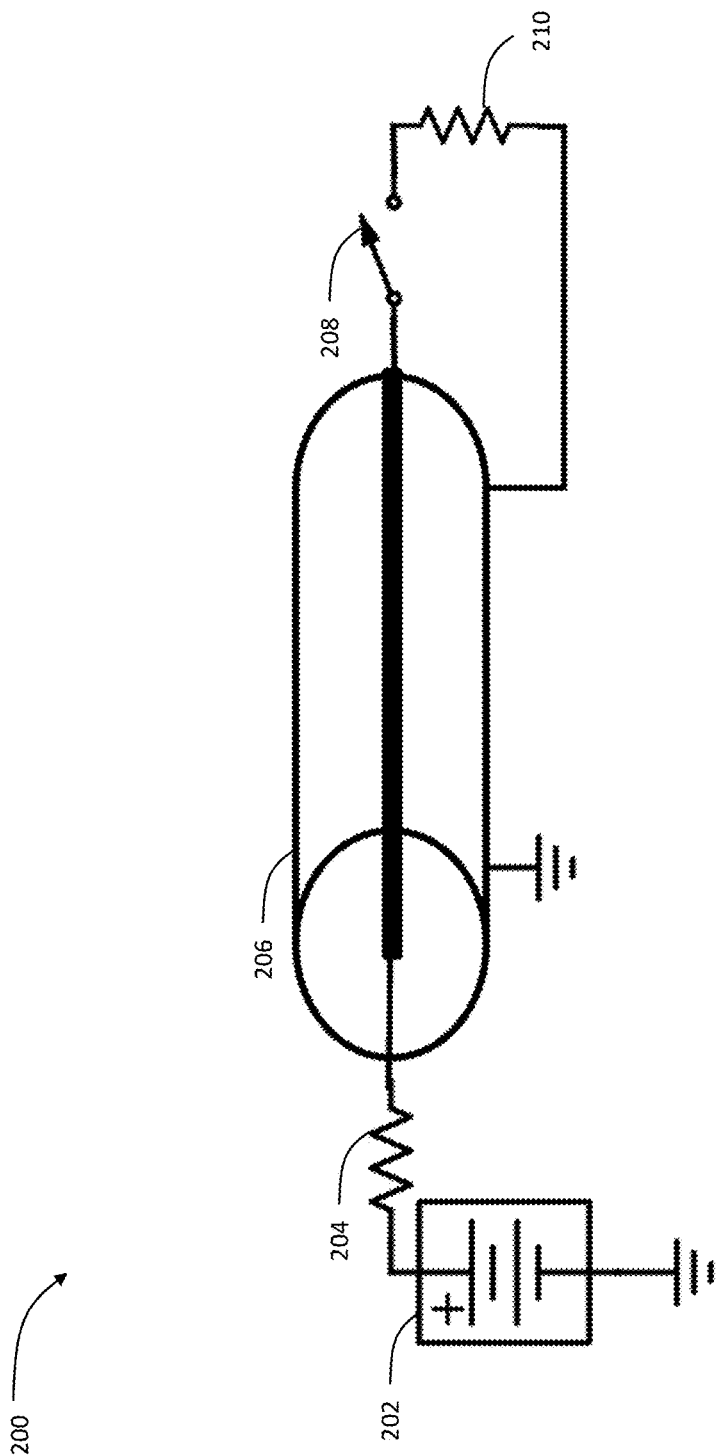
FIG. 2 is a schematic of a system for operating the NLTL of FIG. 1.

FIG. 2 is a schematic of a system 200 for operating the NLTL. The system 200 includes a DC voltage source 202 with its high side coupled to a first conductor of an NLTL 206 at a first side of the NLTL 206 of the present disclosure, via a current limiting resistor 204. The current limiting resistor may be a 5 MΩ resistor. The second conductor of the NLTL is coupled to the ground. The first conductor of the NLTL 206 is coupled to a switch 208 which when closed shorts the first conductor of the NLTL 206 to the second conductor of the NLTL 206 via an impedance matching resistor 210. When the DC voltage source 202 is first coupled to the NLTL 206, the capacitor formed between the first and second conductors of the NLTL 206 begins to charge until fully charged. When the switch 206 closes, a shockwave occurs as a result of the sudden discharge of said capacitor. Depending on the voltage level of the DC voltage source 202, the permittivity of the composite structure between the first and second conductors varies. Therefore, by adjusting the voltage, a different shockwave can be achieved. The shockwave manifests in the form of a high-power microwave burst. There are several switches that can be used for the switch 208, as known to a person having ordinary skill in the art. One such switch may be a spark gap switch.

Alternatively, instead of using a switch to generate the shockwave, a pulse generator may be used in place of the DC voltage source 202. In this embodiment, the current limiting resistor 204 is removed and the pulse generator is directly coupled to the NLTL 206. By adjusting the current which dictates the magnetic field within the NLTL 206 and the voltage of the pulse generator which dictates the electric field, the permittivity of dielectric (i.e., composite material between the first and second conductors of the NLTL 206) is varied. In so doing, the leading edge of the pulse within the NLTL 206 accelerates until it meets the lagging edge which again causes the desired shockwave.

Figure 3:
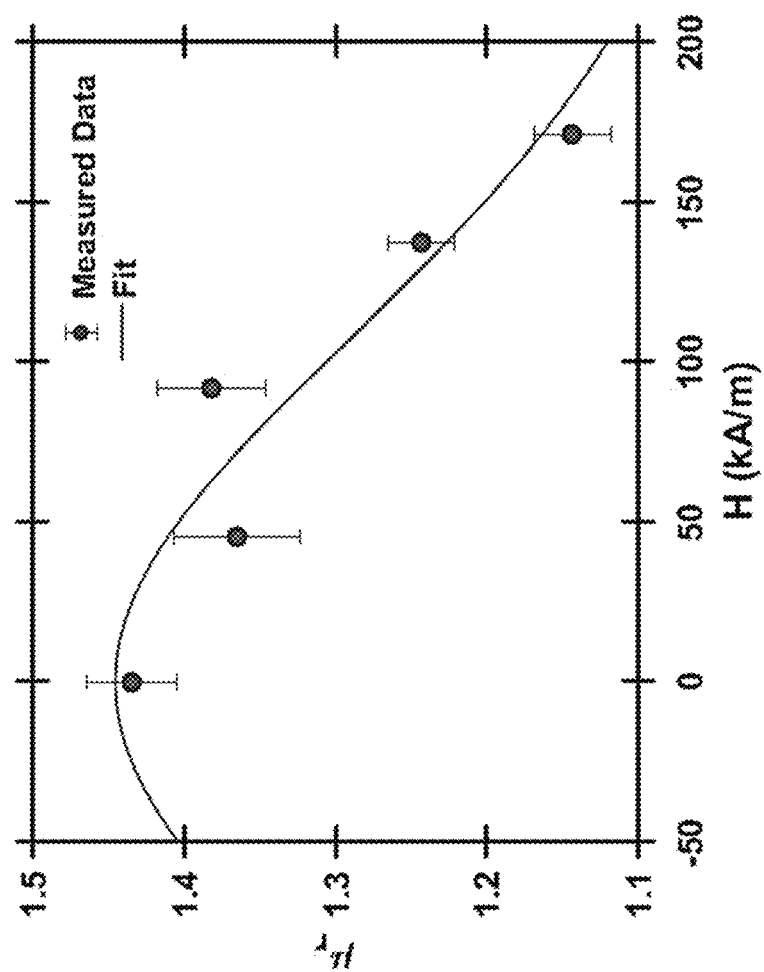
FIG. 3 is a graph of permeability of an example composite shown in FIG. 1 as a function of applied magnetic field.

The NLTLs of the present disclosure were modeled using LT SPICE to estimate the frequency produced by the NLTL and the location of the generated oscillations relative to the pulse. The current dependent inductance was modeled by defining the flux through the inductor. The magnetic field dependence of the permeability of the NZF composites is given by $$\mu(I) = (\mu_i - \mu_s)[1 - \tanh^2(H/H_s)] + \mu_s, \quad (1)$$

where $\mu_i$ is the initial permeability,
$\mu_s$ is the saturation permeability (taken to be unity here),
H is the applied magnetic field, and
$H_s$ is the magnetic field at which the ferrite saturates, set to 2200 G. We used the curve fitting tool in MATLAB to fit previous experimental measurements of composite permeability to equation (1) with FIG. 3 showing an example for a 25% NZF composite. Specifically, FIG. 3 shows the application of MATLAB to fit equation (1) to the measured permeability of a 25% NZF composite as a function of applied magnetic field at 1 GHz. The reported values are the average of four measurements with error bars determined by standard deviation and $R^2 = 0.8856$.

The voltage dependent capacitance was calculated based on the voltage dependent permittivity, given by $$\epsilon(V) = (\epsilon_i - \epsilon_{SAT})[1 - \tanh^2((V-V_0)/V_{SAT})] + \epsilon_{SAT}, \quad (2)$$

where $\epsilon_i$ is the initial permittivity,
$\epsilon_{SAT}$ is the saturated permittivity, which is taken to be the previously measured permittivity of the composites with the given volume fraction of NZF,
$V_{SAT}$ is the voltage at which saturation begins, and V is the voltage. The capacitance and inductance values for each volume fraction are given in Table 2.

TABLE 2

Initial and saturated capacitance and inductance values per inch for the constructed composite NLTLs

| Volume Fraction | $C_0$ (pF/in) | $C_{SAT}$ (pF/in) | $L_0$ (nH/in) | $L_{SAT}$ (nH/in) |
|---|---|---|---|---|
| 25% NZF | 20.9 | 20.9 | 2.99 | 2.06 |
| 10% BST/15% NZF | 23.9 | 14.4 | 2.46 | 2.06 |
| 15% BST/10% NZF | 25.2 | 13.3 | 2.30 | 2.06 |

Figure 4:
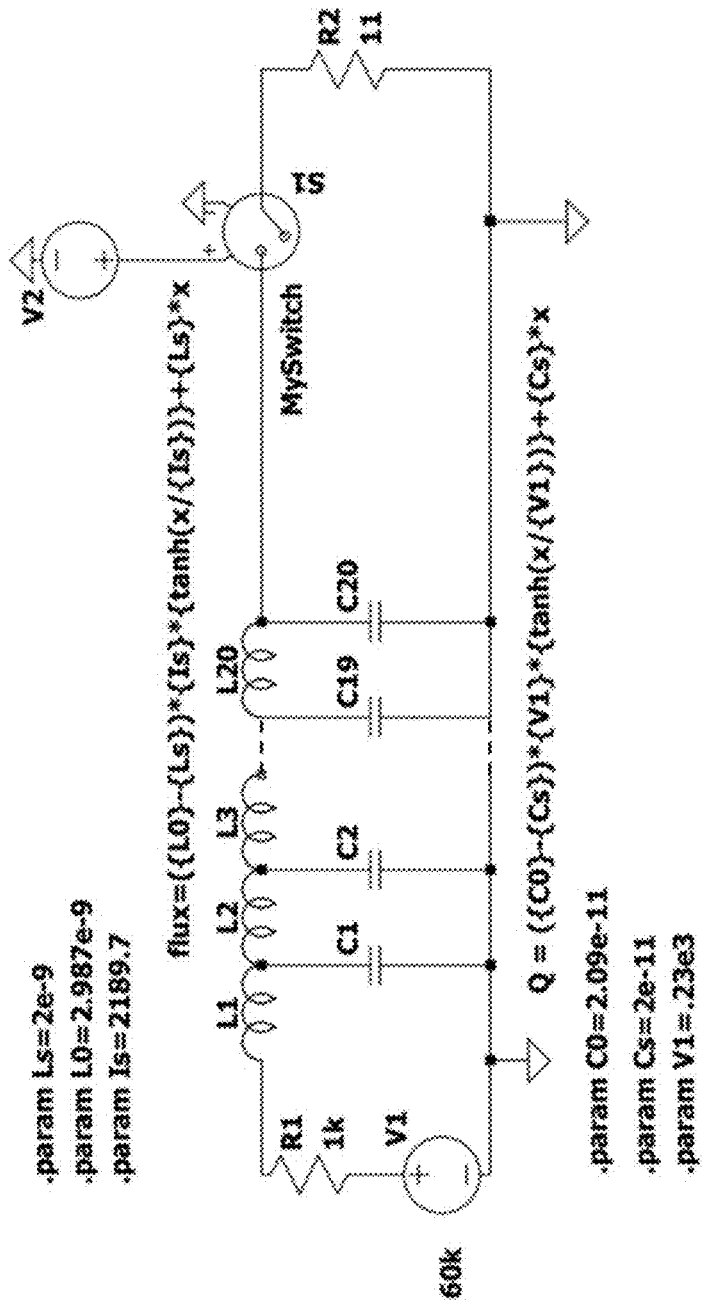
FIG. 4 is a circuit diagram representation of the NLTL according to the present disclosure used as a pulse forming line (PFL) to produce a square pulse that generates electromagnetic waves.

Referring to FIG. 4, a circuit diagram representation of the NLTL used as a PFL is provided to produce a square pulse that generates RF. Specifically, FIG. 4 is a general circuit schematic for a composite-based NLTL comprising non-linear dielectric and magnetic inclusions in a silicone matrix, as a PFL, where Ls is the saturated inductance, L0 is the initial inductance, Is is the current at which the saturation takes place, C0 is the initial capacitance, Cs is the saturated capacitance, and V1 is the saturation voltage. It should be noted that a separate PFL is not used to drive the NLTL, but instead we are using the NLTL as a combined PFL and HPM source; therefore, we apply a DC voltage to the NLTL instead of a pulse waveform, as shown in FIG. 2 and discussed above. The capacitance and inductance based on the dimensions of the NLTL and the material properties for the composites were determined. Specifically, the capacitance and inductance are given per inch and the NLTL is comprised of 20 LC segments to model the 20 in NLTLs that were manufactured and tested. We also simulated a linear transmission line (LTL) with fixed C=C0 and L=L0.

Figure 5B:
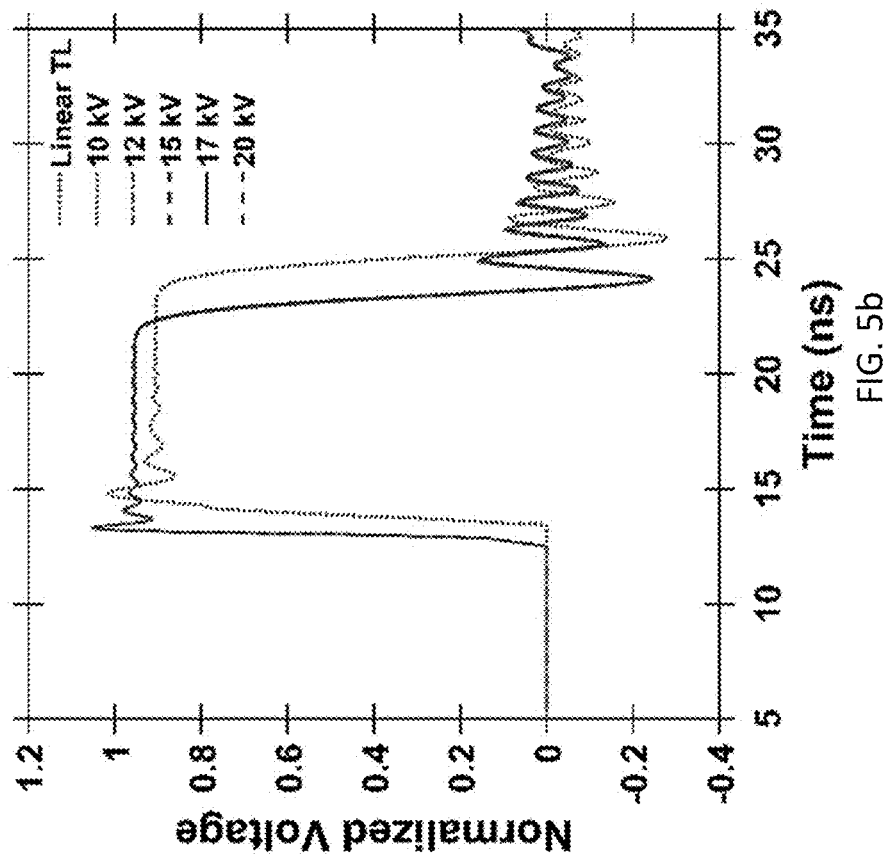
FIGS. 5a and 5b are graphs of voltage in kV (FIG. 5a) and normalized voltage (FIG. 5b) vs. time in ns. which provide simulated voltage waveforms for a 25% nickel zinc ferrite (NZF) composite-based NLTL used as a PFL with various charging voltages and a linear transmission line (linear TL) with a charging voltage of 20 kV at the output as shown in FIG. 5a and at the output normalized to the output voltage of a linear transmission line with the same charging voltage as shown in FIG. 5b.
Figure 5A:
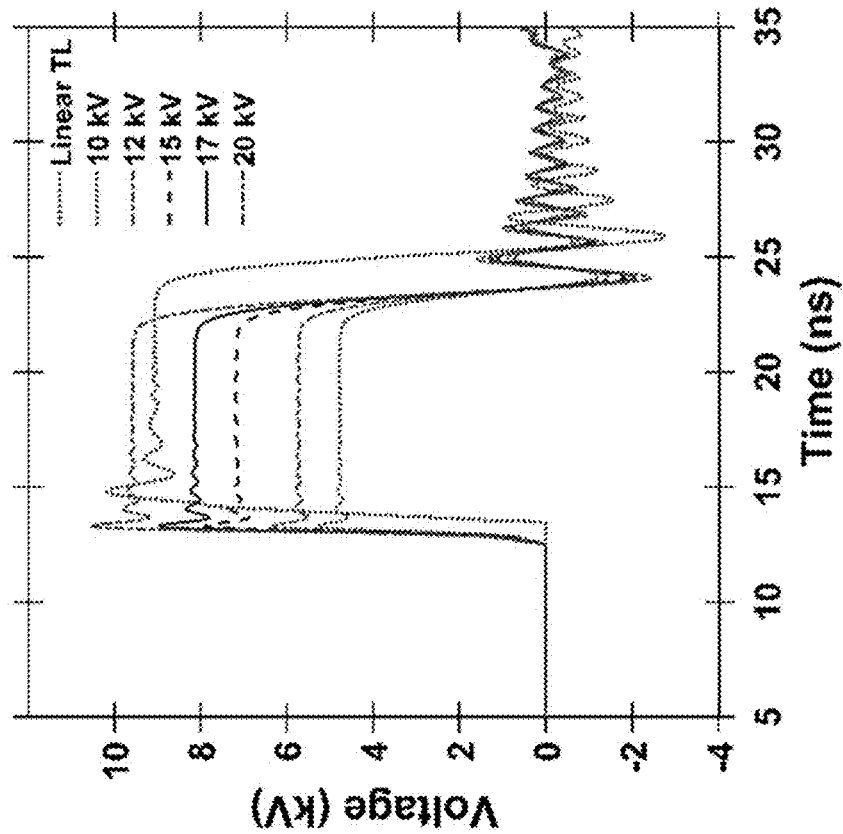

Simulation results are shown in FIGS. 5a and 5b which show the production of oscillations on the flat portion of the pulse, where conventional NLTLs produce their oscillations, and after the pulse at higher amplitudes. FIGS. 5a and 5b are graphs of voltage in kV (FIG. 5a) and normalized voltage (FIG. 5b) vs. time in ns. Specifically, FIGS. 5a and 5b provide simulated voltage waveforms for a 25% NZF composite-based NLTL used as a PFL with various charging voltages and a linear transmission line (linear TL) with a charging voltage of 20 kV at the output as shown in FIG. 5a and at the output normalized to the output voltage of a linear transmission line with the same charging voltage as shown in FIG. 5b. The output for an NLTL with 25% NZF shows strong oscillations on the output that are much higher than the oscillations produced using an LTL. It should be noted that these oscillations are not due to the Gibbs phenomenon, which occurs when the truncation of higher Fourier coefficients due to numerical filtering of the finite space and/or time steps causes superficial oscillations in the time-domain because of the truncated spectrum processed by the inverse discrete Fourier transforms (IDFT), but due to the physical initiation of oscillations. When looking at the IDFT of a truncated signal, oscillations occur before the pulse, directly after the rise time on the flat top of the pulse, directly before the fall time on the flat top of the pulse, and directly after the pulse. The LT SPICE simulations shown in FIGS. 5a and 5b (and, later, in FIGS. 7 and 9) occur only directly after the rise time and directly after the pulse. We have also performed LT SPICE simulations of other pulse conditions that may lead to the Gibbs phenomenon and do not observe these telltale oscillations. Combined, these observations indicate that the observed oscillations are not due to the Gibbs phenomenon and occur due to circuit behavior.

Figure 6B:
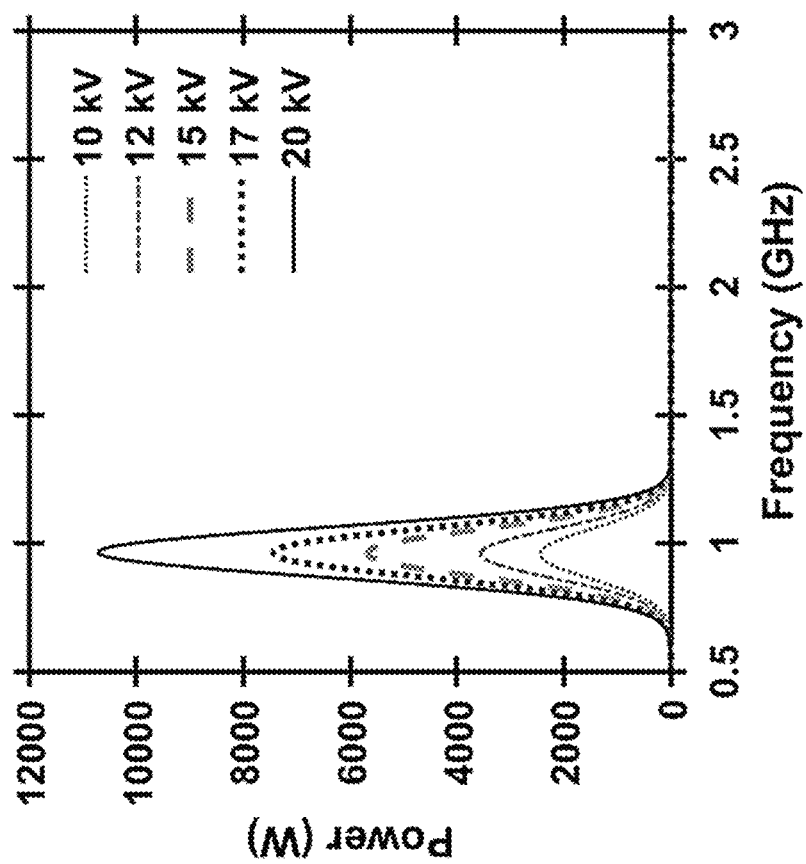
FIGS. 6a and 6b are graphs of power in dBW (FIG. 6a) and W (FIG. 6b) vs. frequency in GHz which show simulated output spectrum of a 25% NZF composite-based NLTL used as a PFL in dBW in FIG. 6a and in linear power after the pulse in FIG. 6b.
Figure 6A:
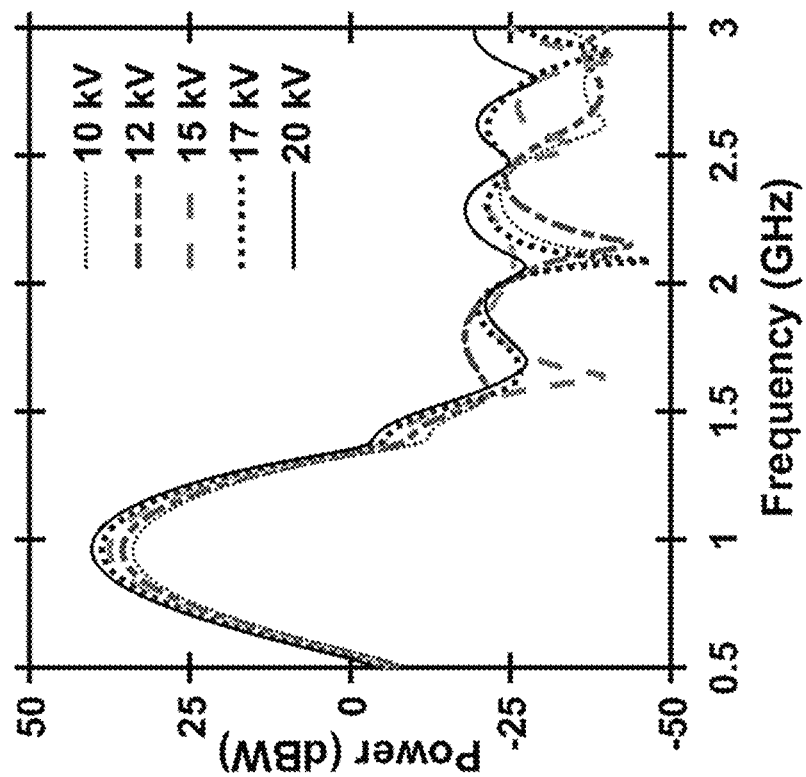

Referring to FIGS. 6a and 6b, graphs of power in dBW (FIG. 6a) and W (FIG. 6b) vs. frequency in GHz are provided. These figures show simulated output spectrum of a 25% NZF composite-based NLTL used as a PFL in dBW in FIG. 6a and in linear power after the pulse in FIG. 6b. Specifically, FIGS. 6a and 6b show the simulated spectral analysis of the oscillations that are produced after the pulse shown in FIGS. 5a and 5b. As shown, the output frequency is at 960 MHz, which matches well with the experimental data shown in FIG. 12, further discussed below. The output power of the oscillations continues to grow with increasing voltage, as seen in the experimental data.

Figure 7B:
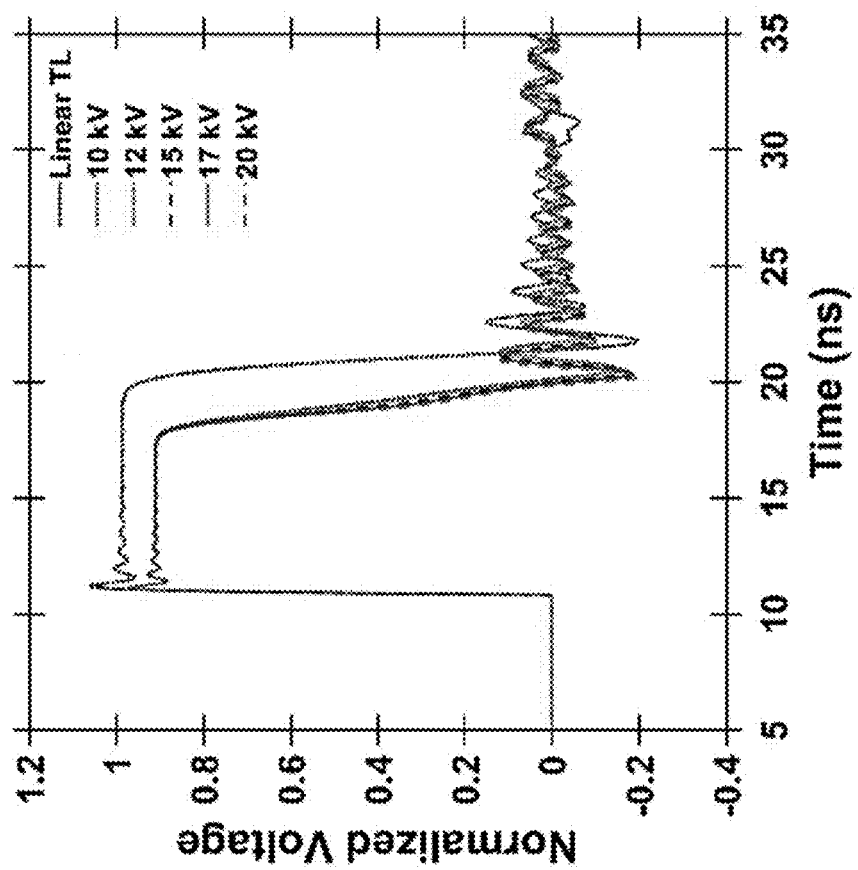
FIGS. 7a and 7b are graphs of voltage in kV (FIG. 7a) and normalized voltage (FIG. 7b) vs. time in ns which show simulated voltage waveforms for a 10% barium strontium titanate (BST)/15% NZF composite-based NLTL used as a PFL with various charging voltages and a linear transmission line (linear TL) with a charging voltage of 20 kV as shown in FIG. 7a and the output normalized to the output voltage of a linear transmission line with the same charging voltage as shown in FIG. 7b.
Figure 7A:
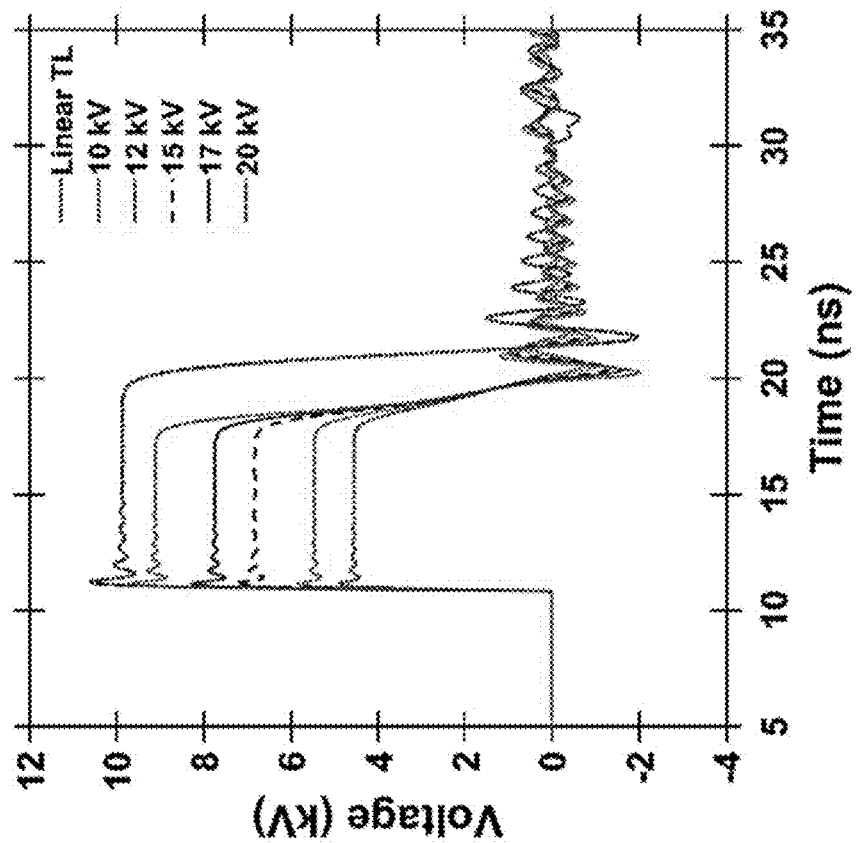
Figure 8B:
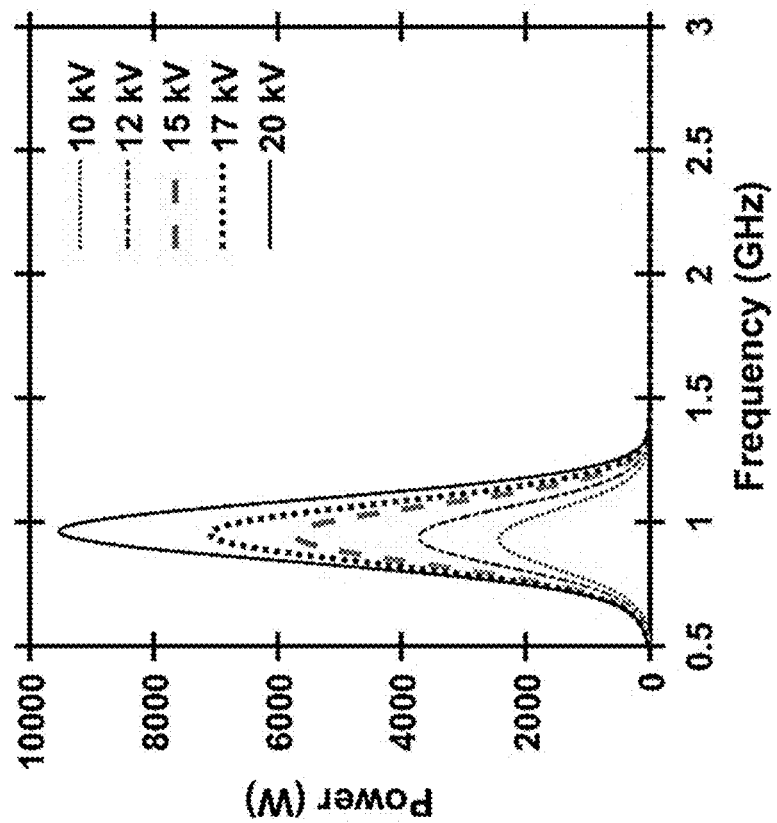
FIGS. 8a and 8b are graphs of power in dBW (FIG. 8) and W (FIG. 8b) vs. frequency in GHz which provide simulated output spectrum for a 10% BST/15% NZF composite-based NLTL used as a PFL after the initial pulse, in dBW and linear power, as a function of frequency in GHz, respectively.
Figure 8A:
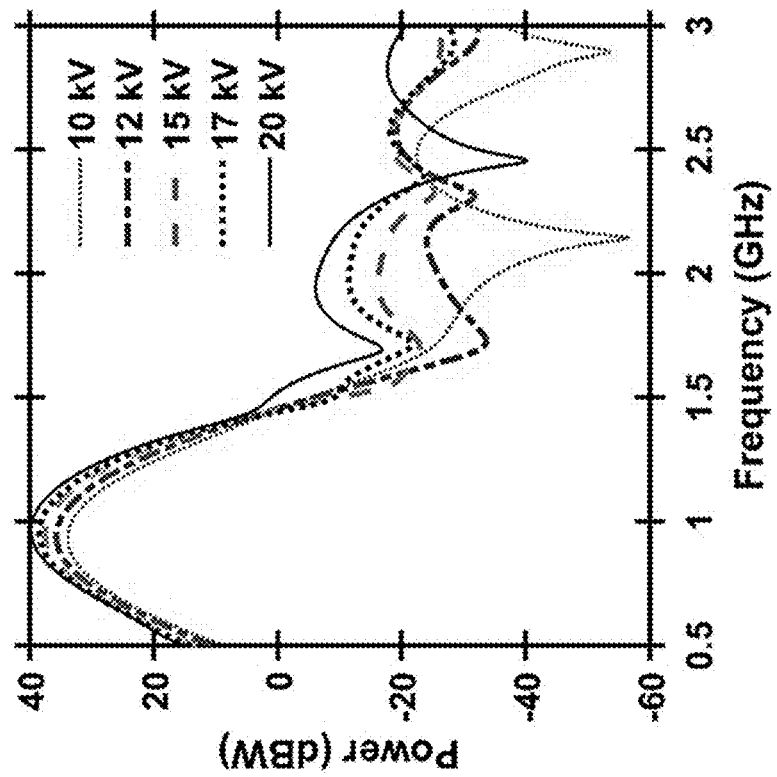

FIGS. 7a and 7b show the same analysis for a 10% BST/15% NZF composite-based NLTL. FIGS. 7a and 7b are graphs of voltage in kV (FIG. 7a) and normalized voltage (FIG. 7b) vs. time in ns. Specifically, FIG. 7a shows simulated voltage waveforms for a 10% BST/15% NZF composite-based NLTL used as a PFL with various charging voltages and a linear transmission line (linear TL) with a charging voltage of 20 kV and FIG. 7b shows the output normalized to the output voltage of a linear transmission line with the same charging voltage is shown in FIG. 7b. The output pulse of the NLTL is shorter in duration than the output pulse of the LTL due to the non-linear permittivity of the composite. The high charging voltage of the line decreases the initial permittivity to the saturated state, which increases the propagation velocity and decreases the pulse width; $V_{sat}$ determines the charging voltage for this to occur. Since we do not know $V_{SAT}$ for our composites, we performed a parametric study and obtained $V_{SAT}=2$ kV as an appropriate value. The oscillations for the NLTL were also at a higher frequency (1 GHz) and amplitude than for the LTL, as shown in FIGS. 8a and 8b, which provide simulated output spectrum for a 10% BST/15% NZF composite-based NLTL used as a PFL after the initial pulse, in dBW and linear power, as a function of frequency in GHz, respectively.

Figure 9B:
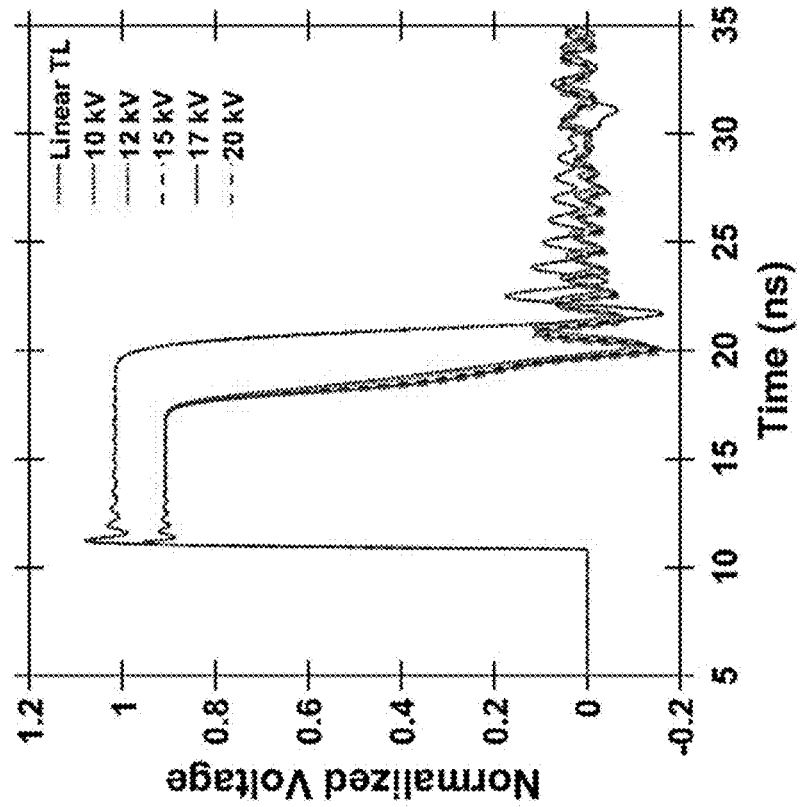
FIGS. 9a and 9b are graphs of voltage in kV (FIG. 9a) and normalized voltage (FIG. 9b) vs. time in ns which provide simulated voltage waveforms for a 15% BST/10% NZF composite-based NLTL used as a PFL with various charging voltages and a linear transmission line (linear TL) with a charging voltage of 20 kV at the output as shown in FIG. 9a and the output normalized to the output voltage of a linear transmission line with the same charging voltage as shown in FIG. 9b.
Figure 9A:
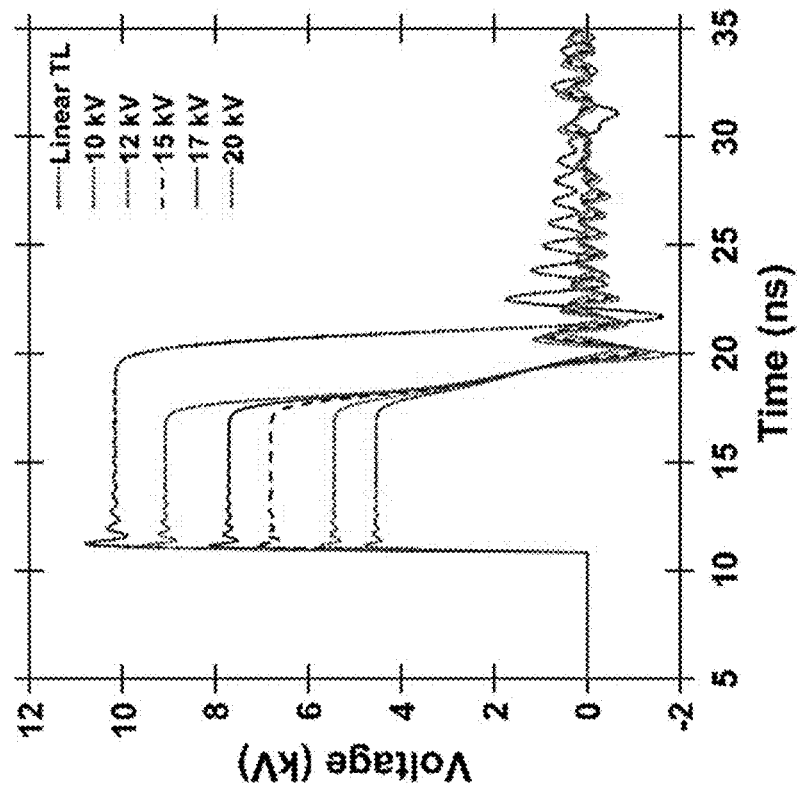
Figure 10B:
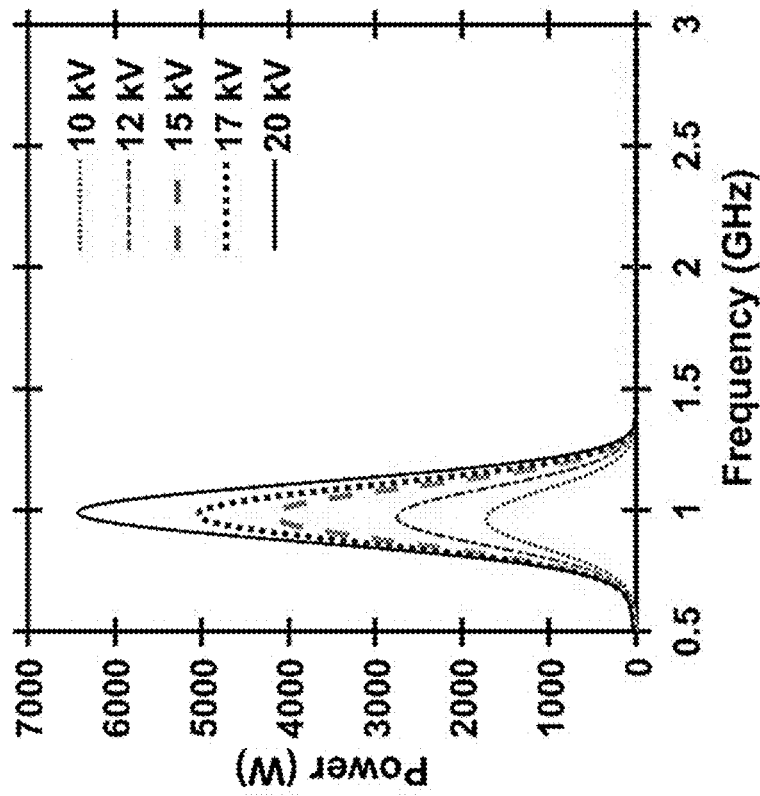
FIGS. 10a and 10b are graphs of power in dBW (FIG. 10a) and W (FIG. 10b) vs. Frequency in GHz which provide simulated output spectrum of the oscillations following the applied pulse for a 15% BST/10% NZF composite-based NLTL used as a PFL in dBW, as shown in FIG. 10a, and in linear power, as shown in FIG. 10b.
Figure 10A:
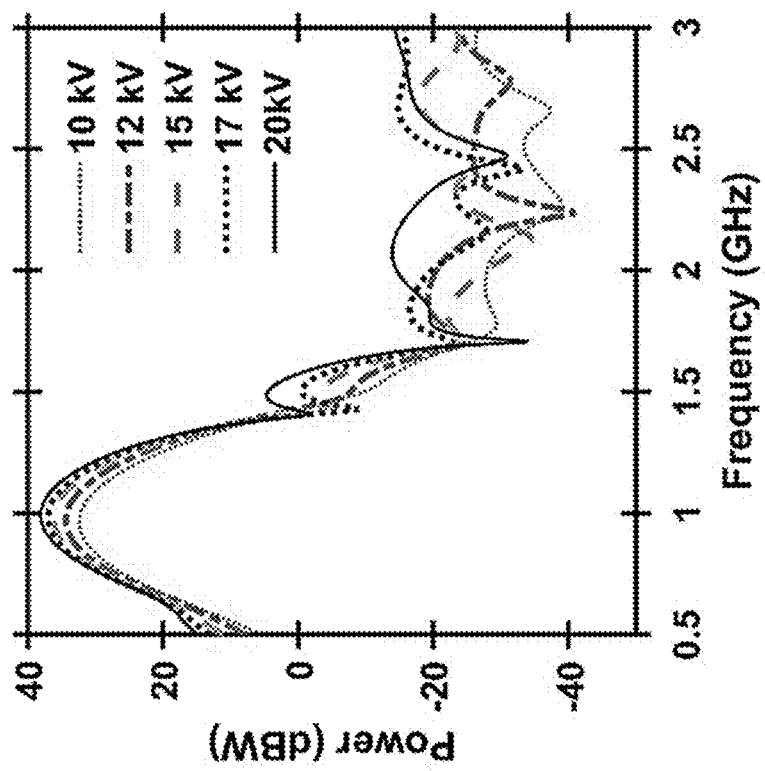

Referring to FIGS. 9a and 9b, simulation results for an NLTL comprised of 15% BST and 10% NZF are provided. FIGS. 9a and 9b are graphs of voltage in kV (FIG. 9a) and normalized voltage (FIG. 9b) vs. time in ns. Specifically, simulated voltage waveforms for a 15% BST/10% NZF composite-based NLTL used as a PFL with various charging voltages and a linear transmission line (linear TL) with a charging voltage of 20 kV at the output is shown in FIG. 9a and the output normalized to the output voltage of a linear transmission line with the same charging voltage is shown in FIG. 9b. Again, the output pulse from the NLTL is shorter in duration than that of the LTL due to the magnitude of $V_{sat}$. The frequency of the oscillations after the flat top was 1 GHz, as shown in FIGS. 10a and 10b, which provide simulated output spectrum of the oscillations following the applied pulse for a 15% BST/10% NZF composite-based NLTL used as a PFL in dBW shown in FIG. 10a and in linear power shown in FIG. 10b. Referring to FIGS. 10a and 10b, graphs of power in dBW (FIG. 10a) and W (FIG. 10b) vs. Frequency in GHz are provided.

Figure 11:
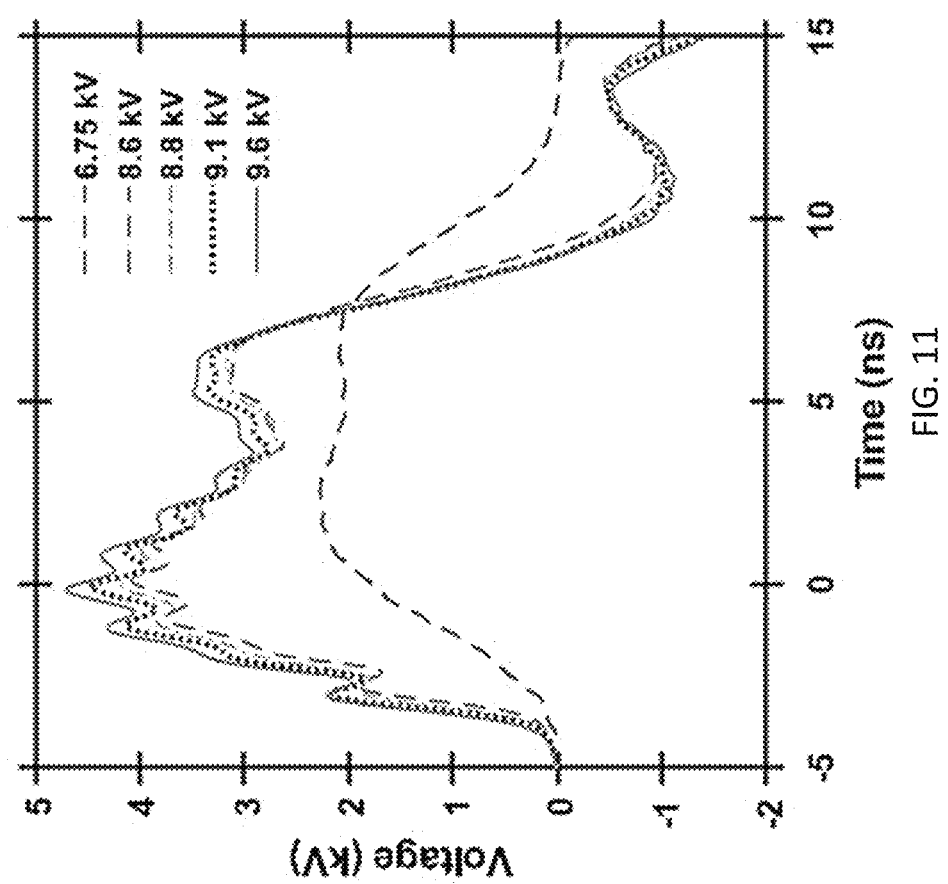
FIG. 11 is a graph of voltage in kV vs. time in ns which shows that increasing the charging voltage decreased the rise time of the output pulse and caused oscillations to develop.

The 25% NZF composite-based NLTL was tested at different voltages to determine the output frequency of oscillations. FIG. 11 is a graph of voltage in kV vs. time in ns which shows that increasing the charging voltage decreased the rise time of the output pulse and caused oscillations to develop. Specifically, FIG. 11 provides measured output voltage waveforms from a 25% NZF composite-based NLTL used as a PFL. The RF burst had a duration of 5 ns. Increasing the charging voltage produced a small current draw when only NZF inclusions were used, resulting in a voltage drop across the charging resistor that limited the maximum charging voltage of the NLTL. This prevented the charging voltage from reaching the values in simulation where oscillations form after the pulse and during the pulse, and much lower output power at corresponding charging voltages.

Figure 12B:
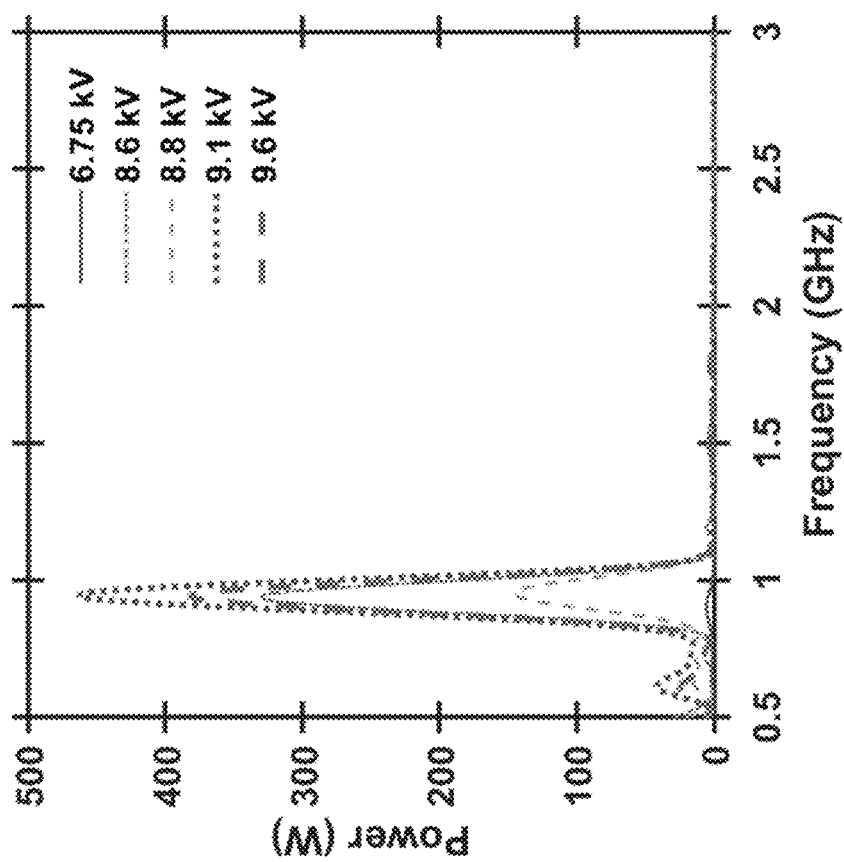
FIGS. 12a and 12b are graphs of power in dBW (FIG. 12a) and W (FIG. 12b) vs. frequency in GHz which show measured output spectrum of a 25% NZF composite-based NLTL used as a PFL in dBW as shown in FIG. 12a and in linear power as shown in FIG. 12b.
Figure 12A:
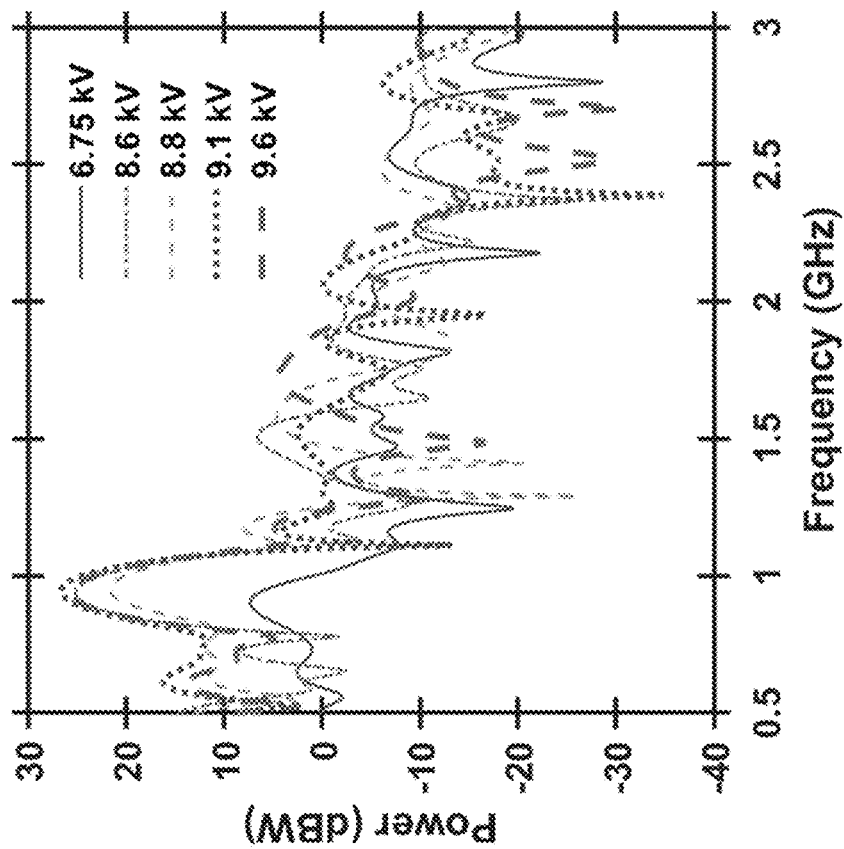

The generated oscillations were centered around 950 MHz and occur at the peak of the output waveform, in agreement with the simulations. Referring to FIGS. 12a and 12b, graphs of power in dBW (FIG. 12a) and W (FIG. 12b) vs. frequency in GHz are provided. FIGS. 12a and 12b show that the output power of the oscillations generally increased with increasing charging voltage. Specifically, measured output spectrum of a 25% NZF composite-based NLTL used as a PFL are provided in dBW as shown in FIG. 12a and in linear power as provided in FIG. 12b. FIG. 12b shows that while the power of the output peak is slightly higher for a charging voltage of 9.1 kV than for 9.6 kV, the output power was more concentrated at 950 MHz for the 9.6 kV peak since the power at frequencies slightly below 950 MHz was much lower for the 9.6 kV charging voltage than for the 9.1 kV charging voltage, making the overall fraction of power at 950 MHz higher compared to the surrounding frequencies for the 9.6 kV charging voltage. For a charging voltage of 9.1 kV, the output power of the line exceeded 400 W at 950 MHz.

Figure 13:
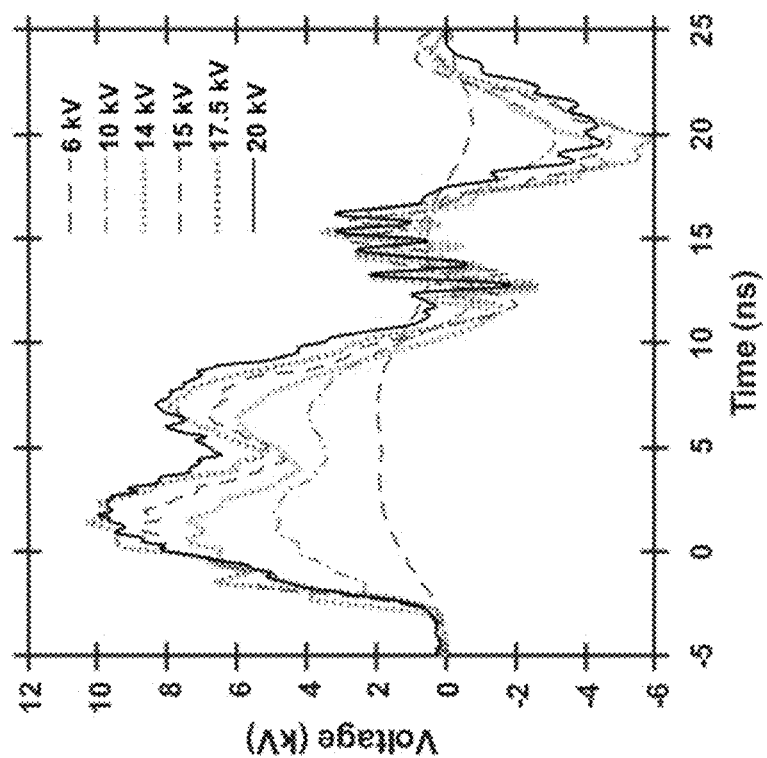
FIG. 13 is a graph of voltage in V vs. time in ns is provided which shows that increasing the charging voltage decreased the rise time of the output pulse and eventually induced oscillations with a lower peak-to-peak amplitude.

These measurements were repeated for a 10% BST/15% NZF composite-based NLTL. Referring to FIG. 13, a graph of voltage in V vs. time in ns is provided. FIG. 13 shows that increasing the charging voltage decreased the rise time of the output pulse and eventually induced oscillations with a lower peak-to-peak amplitude than those in the flat top, in agreement with the simulation results from FIGS. 7a and 7b. Increasing the charging voltage to 14 kV created oscillations after the pulse, which increased in amplitude with increasing charging voltage.

Figure 14B:
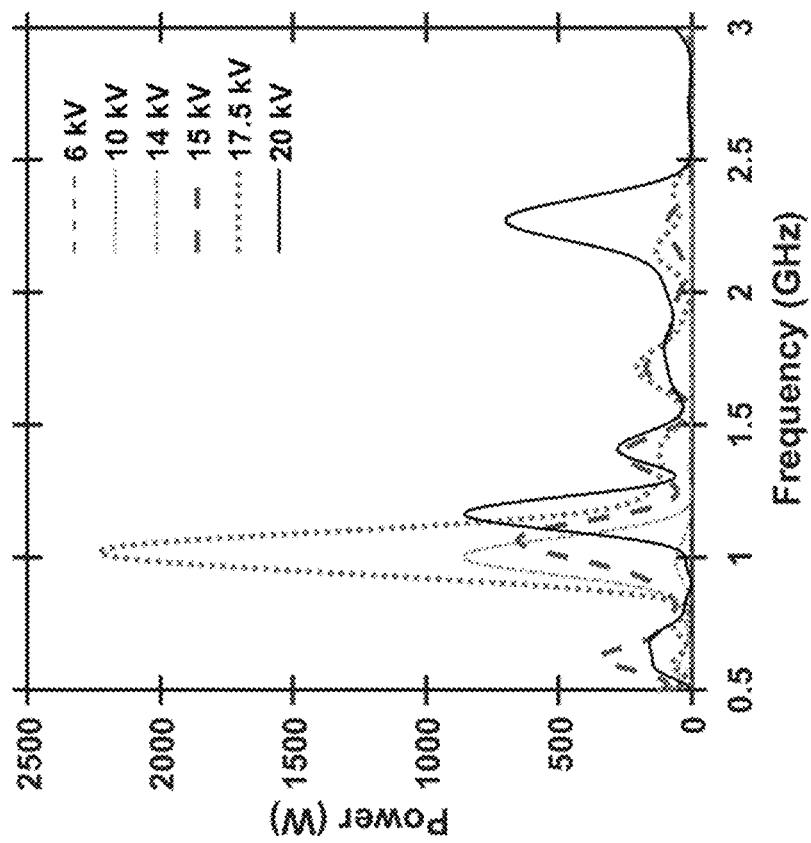
FIGS. 14a and 14b are graphs of power in dBW (FIG. 14a) and W (FIG. 14b) vs. frequency in GHz which show measured output spectrum of a 10% BST/15% NZF composite-based NLTL used as a PFL in dBW as shown in FIG. 14a and in linear power during the pulse as shown in FIG. 14b.
Figure 14A:
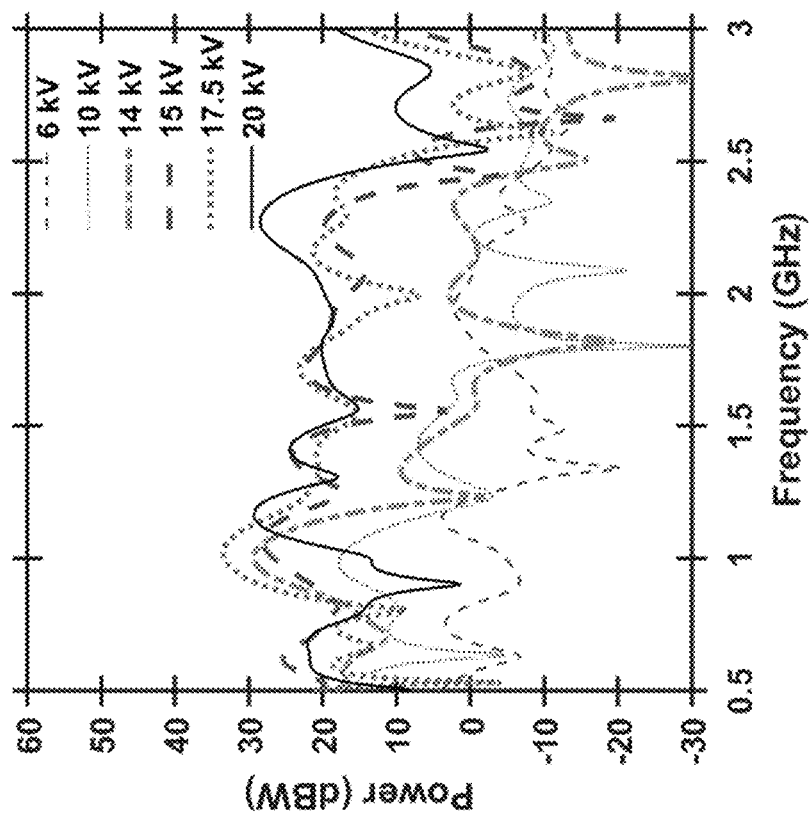

Referring to FIGS. 14a and 14b, graphs of power in dBW (FIG. 14a) and W (FIG. 14b) vs. Frequency in GHz are provided. Specifically, measured output spectrum of a 10% BST/15% NZF composite-based NLTL used as a PFL in dBW is provided in FIG. 14a and in linear power during the pulse is shown in FIG. 14b. These figures show that the oscillations produced on the flat top of the pulse were centered at 1 GHz, agreeing well with frequency of the oscillations shown in the simulations. The output power of the oscillations during the flat top increased with increasing charging voltage except when oscillations were formed after the pulse. For a comparable charging voltage, the output power for the 10% BST/15% NZF composite-based NLTL was less than that of the 25% NZF composite-based NLTL. Specifically, FIG. 14b shows that increasing the charging voltage introduced a secondary frequency at 2.27 GHz and increased the frequency of the first peak to 1.17 GHz. The output power at 20 kV was divided primarily between the two main peaks at 1.17 GHz and 2.27 GHz.

Figure 15B:
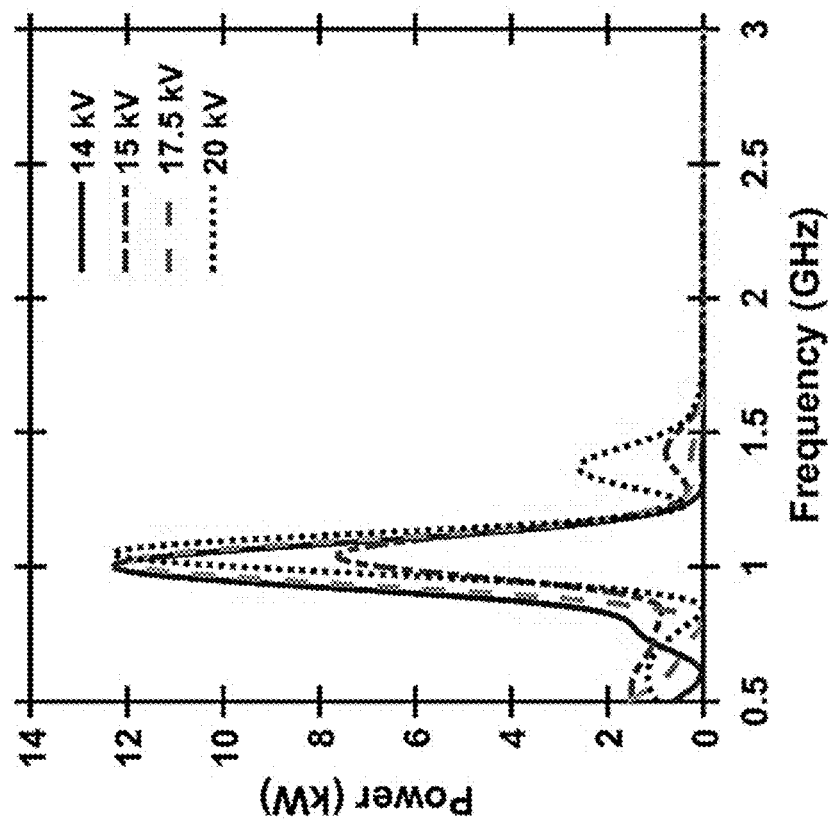
FIGS. 15a and 15b are graphs of power in dBW (FIG. 15a) and W (FIG. 15b) vs. Frequency in GHz which show measured output spectrum for a 10% BST/15% NZF composite-based NLTL used as a PFL after the initial pulse in dBW as shown in FIG. 15a and linear power as shown in FIG. 15b.
Figure 15A:
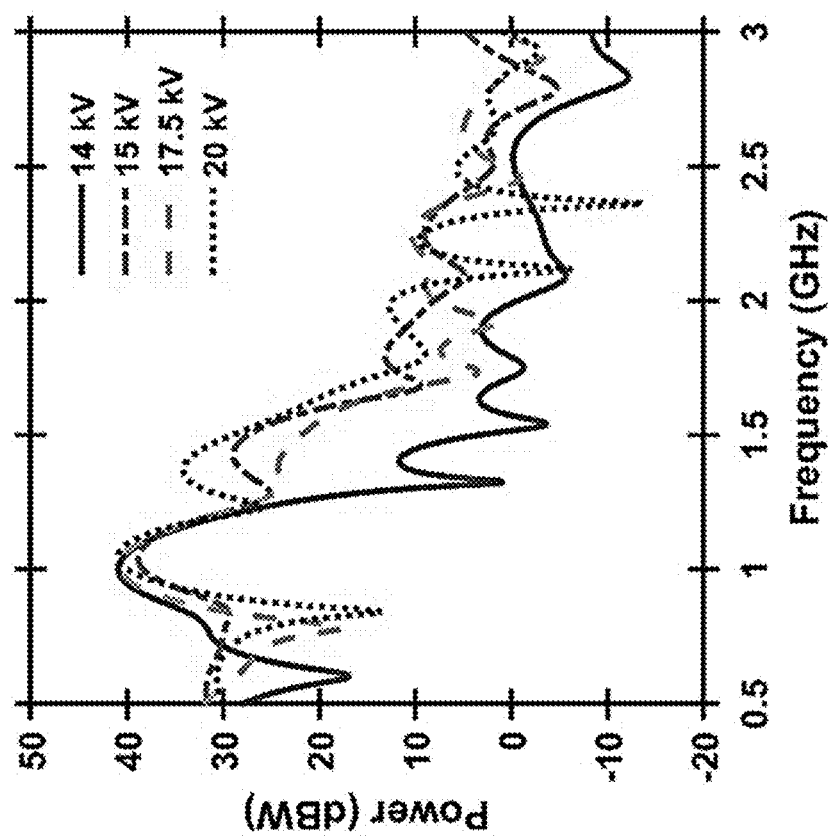

Referring to FIGS. 15a and 15b, graphs of power in dBW (FIG. 15a) and W (FIG. 15b) vs. Frequency in GHz are provided. Specifically, measured output spectrum for a 10% BST/15% NZF composite-based NLTL used as a PFL after the initial pulse in dBW is shown in FIG. 15a and linear power is shown in FIG. 15b. These figures show the output spectrum for the oscillations after the pulse obtained by performing a power spectrum density of the post-pulse oscillations. The amplitude of the oscillations after the pulse generally increased with charging voltage, exceeding those during the pulse by almost an order of magnitude. A second peak is also generated at 1.42 GHz and 1.36 GHz for a 15 kV and 20 kV charging voltage, respectively. The output power was also distributed between higher frequencies for charging voltages above 14 kV, as shown in FIG. 15a.

Figure 16:
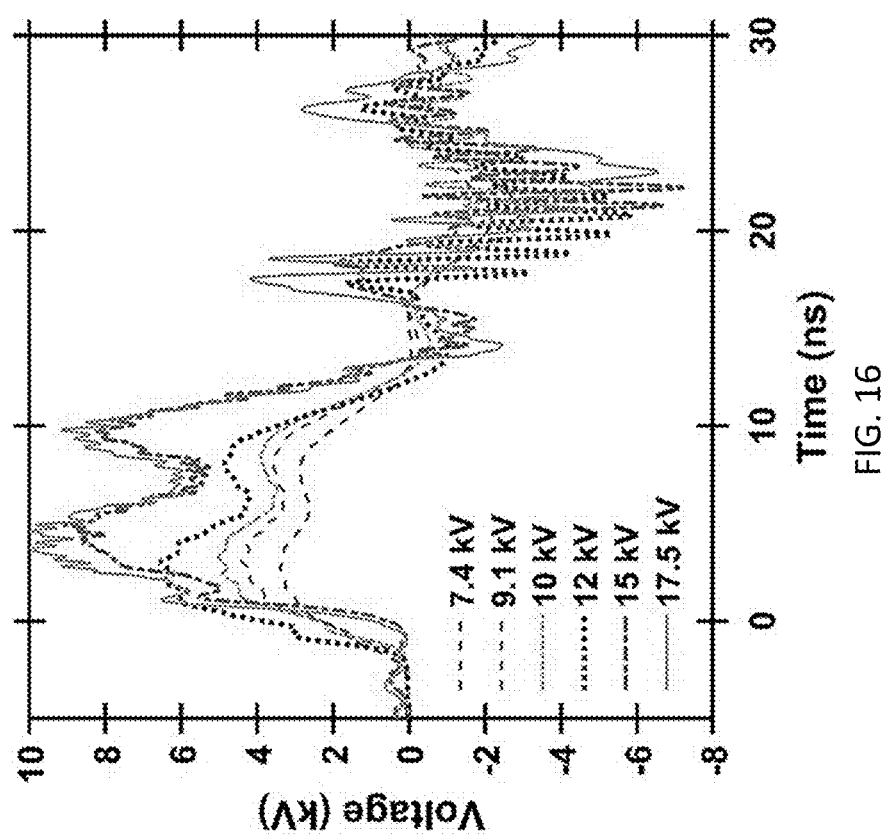
FIG. 16 is a graph of voltage in V vs. time in ns is provided which shows the measured output waveforms when testing a 15% BST/10% NZF composite-based NLTL.
Figure 18B:
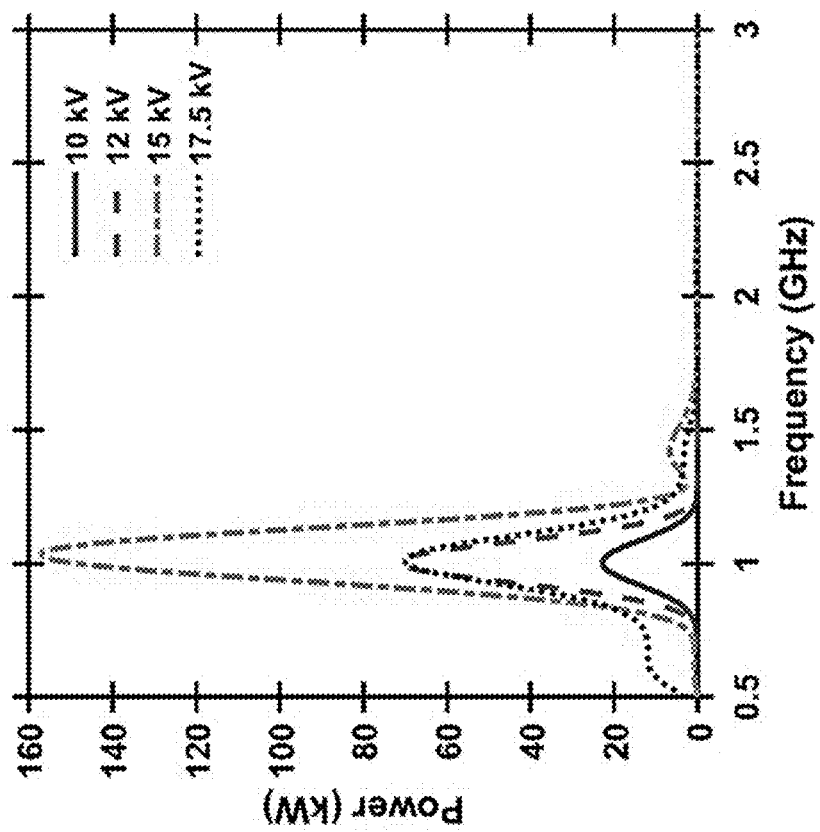
Figure 18A:
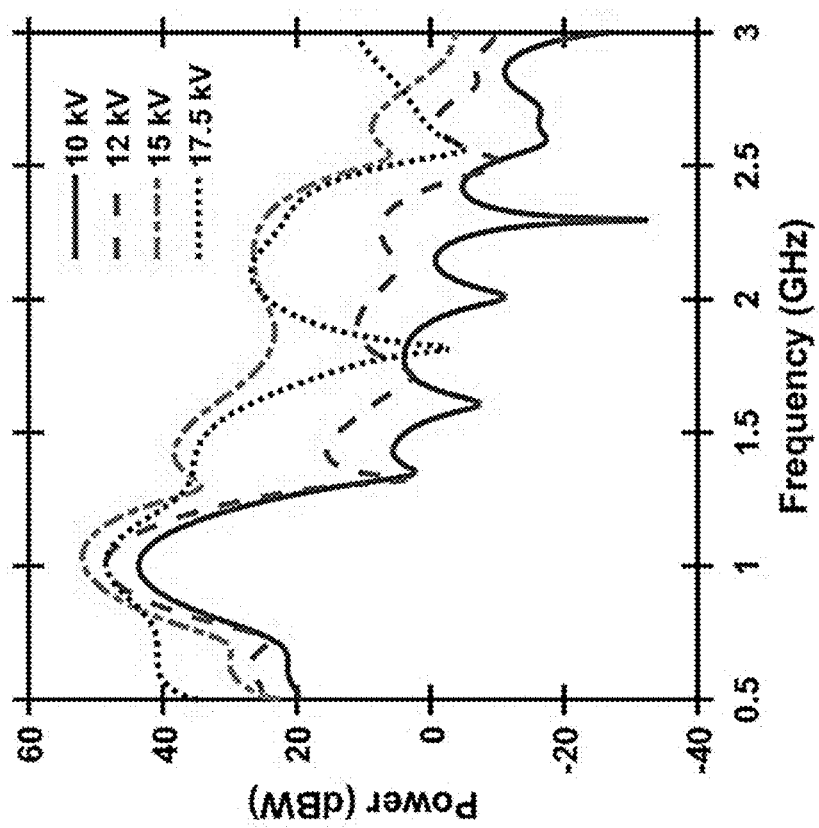

Referring to FIG. 16, a graph of voltage in V vs. time in ns is provided. FIG. 16 shows the measured output waveforms when testing a 15% BST/10% NZF composite-based NLTL. We charged the NLTL to a higher voltage until breakdown occurred across the outside of the spark gap. Increasing the charging voltage reduced the rise time and produced oscillations. Charging the NLTL to 10 kV or above produced stronger oscillations after the pulse (4.83 kV) than on the flat top of the pulse (0.61 kV). The RF burst on the flat top of the pulse had a duration of 5 ns, while the strong oscillations after the pulse had a duration of 10 ns.

Referring to FIGS. 17a and 17b and FIGS. 18a and 18b, graphs of power in dBW (FIGS. 17a and 18a) and W (FIGS. 17b and 18b) vs. Frequency in GHz are provided. These figures show the output spectrum for oscillations during the pulse flat top and at the end of the pulse, respectively, when using a 15% BST/10% NZF composite-based NLTL. The output power of the oscillations on the pulse flat top increased with increasing charging voltage, producing higher overall output power. The oscillations were centered around 1 GHz, in agreement with simulation, until increasing the charging voltage to 15 kV, which produced a large peak at 2.28 GHz that also occurred for the 10% BST/15% NZF composite-based NLTL. The amplitude of the oscillations after the pulse flat top for this composite-based NLTL exceeded those on the flat top of any of the composite-based NLTLs in this study. FIG. 18 shows that the oscillations following the flat top were centered around 1 GHz at all charging voltages and increased in power with increasing charging voltage until reaching a peak power of −160 kW at a 15 kV charging voltage.

Those having ordinary skill in the art will recognize that numerous modifications can be made to the specific implementations described above. The implementations should not be limited to the particular limitations described. Other implementations may be possible.

The invention claimed is:

1. A system for generating electromagnetic waves, comprising:
    a direct current (DC) voltage source; and
    a transmission line coupled to the DC voltage source;
    the transmission line, comprising:
        a first conductor;
        a second conductor; and
        a composite disposed between the first conductor and the second conductor;
    the composite, comprising:
        non-linear inclusions comprising one or more of non-linear dielectric and non-linear magnetic inclusions mixed in a matrix material,
        wherein the non-linear dielectric inclusions are selected from the group consisting of barium strontium titanate (BST), barium titanate, strontium titanate, barium zirconate titanate, lead zirconate titanate, lead titanate, lithium niobate, potassium niobate, lead scandium tantalate, strontium barium niobate, and combinations thereof, and the non-linear magnetic inclusions are selected from the group consisting of nickel zinc ferrite (NZF), manganese zinc ferrite, cobalt ferrite, manganese ferrite, zinc ferrite, nickel ferrite, and combinations thereof,
    wherein the non-linear inclusions by volume are about 25% NZF/about 75% matrix material, about 10% BST/15% NZF/about 75% matrix material, or about 15% BST/10% NZF/about 75% matrix material,
    wherein the DC voltage source has a ground that is coupled to second conductor of the transmission line;
    wherein the first conductor, the second conductor, and the composite form a capacitor;
    wherein the capacitor in the transmission line is charged by the DC voltage source and when quickly discharged, generates an electromagnetic wave that generates a microwave burst,
    whereby the capacitor is quickly discharged by a switch disposed after the transmission line that is configured to short the first conductor to the second conductor, thereby eliminating a need for a pulse generator.

2. The system of claim 1, wherein the composite has a permittivity between about 2.1 to about 1000.

3. The system of claim 1, wherein the composite has a permeability between about 1.5 to about 15.

4. The system of claim 1, wherein the matrix material is selected from the group consisting of silicon, ceramic, polydimethylsiloxane, and a combination thereof.

5. The system of claim 1, wherein the first and the second conductors are disposed in a coaxial configuration.

6. The system of claim 1, wherein the first and the second conductors are disposed in a planar configuration.

7. The system of claim 1, wherein an electrical load is provided after the switch, the electrical load is an antenna or an impedance matching resistor.

* * * * *